United States Patent [19]
Nakashima et al.

[11] Patent Number: 5,585,815
[45] Date of Patent: Dec. 17, 1996

[54] DISPLAY HAVING A SWITCHING ELEMENT FOR DISCONNECTING A SCANNING CONDUCTOR LINE FROM A SCANNING CONDUCTOR LINE DRIVE ELEMENT IN SYNCHRONIZATION WITH A LEVEL FALL OF AN INPUT VIDEO SIGNAL

[75] Inventors: Takashi Nakashima, Nara; Kiyoshi Inada, Jouyou; Yasunobu Tagusa, Ikoma; Hiroshi Shimokawa, Nara; Hidemi Akiyama, Tenri; Yuji Yamamoto, Kobe, all of Japan

[73] Assignee: Sharp Kabushiki Kaisha, Osaka, Japan

[21] Appl. No.: 437,977

[22] Filed: May 10, 1995

Related U.S. Application Data

[63] Continuation of Ser. No. 164,460, Dec. 9, 1993, abandoned.

[30] Foreign Application Priority Data

| Dec. 10, 1992 | [JP] | Japan | 4-330718 |
| Jan. 4, 1993 | [JP] | Japan | 5-000078 |
| Aug. 30, 1993 | [JP] | Japan | 5-213853 |
| Nov. 10, 1993 | [JP] | Japan | 5-281296 |

[51] Int. Cl.$^6$ ............................................. G09G 3/36
[52] U.S. Cl. ........................................ 345/100; 345/206
[58] Field of Search ............................ 345/98, 100, 103, 345/205, 206

[56] References Cited

U.S. PATENT DOCUMENTS

| 4,803,480 | 2/1989 | Soneda et al. | 345/90 |
| 4,816,819 | 3/1989 | Enari et al. | |
| 5,028,916 | 7/1991 | Ichikawa et al. | 345/98 |
| 5,105,288 | 4/1992 | Senda et al. | |
| 5,151,689 | 9/1992 | Kabuto et al. | 345/103 |
| 5,194,853 | 3/1993 | Asada | 345/100 |
| 5,268,678 | 12/1993 | Nakazawa et al. | 345/103 |

FOREIGN PATENT DOCUMENTS

| 086619 | 8/1983 | European Pat. Off. . |
| 0269744A | 5/1987 | European Pat. Off. . |
| 63-088525 | 4/1988 | Japan . |
| 5-14915 | 2/1992 | Japan . |
| 4-31371 | 5/1992 | Japan . |
| 4265944 | 9/1992 | Japan . |
| 2166899 | 5/1986 | United Kingdom . |

*Primary Examiner*—Jeffery Brier

[57] ABSTRACT

A display device includes unit cells, each including a thin film transistor and a pixel, arrayed in a matrix form on a display board. First switching elements are provided at intersections between signal conductor lines and scanning conductor lines, scanning conductor line drive elements driving the scanning conductor lines. Finally, second switching elements are included, one provided between each scanning conductor line and scanning conductor line drive element. Each second switching element is put into an open state in synchronization with a fall in level of an input video signal provided to a signal conductor line to electrically disconnect the corresponding scanning conductor line from the scanning conductor line drive element. Thus, the scanning conductor line drive element is not affected by instantaneous voltage drop on the corresponding scanning conductor line.

2 Claims, 24 Drawing Sheets

Fig.4

| Fig.4A |
|---|
| Fig.4B |

Fig.4A PRIOR ART

- S1: SUPPLY CONNECTION MATERIAL TO SIGNAL LINE DRIVE CIRCUIT BOARD OR DISPLAY BOARD
- S2: ALIGN SIGNAL LINE DRIVE CIRCUIT BOARD WITH DISPLAY BOARD
- S3: CONNECT SIGNAL LINE DRIVE CIRCUIT BOARD WITH DISPLAY BOARD
- S4: TURN DISPLAY BOARD BY 90°
- S5: SUPPLY CONNECTION MATERIAL TO SCANNING LINE DRIVE CIRCUIT BOARD OR DISPLAY BOARD
- S6: ALIGN SCANNING LINE DRIVE CIRCUIT BOARD WITH DISPLAY BOARD
- S7: CONNECT SCANNING LINE DRIVE CIRCUIT BOARD WITH DISPLAY BOARD
- S8: TRANSFER DISPLAY BOARD
- S9: SUPPLY JUNCTION BOARD WITH SCANNING LINE DISPLAY CIRCUIT BOARD (A)

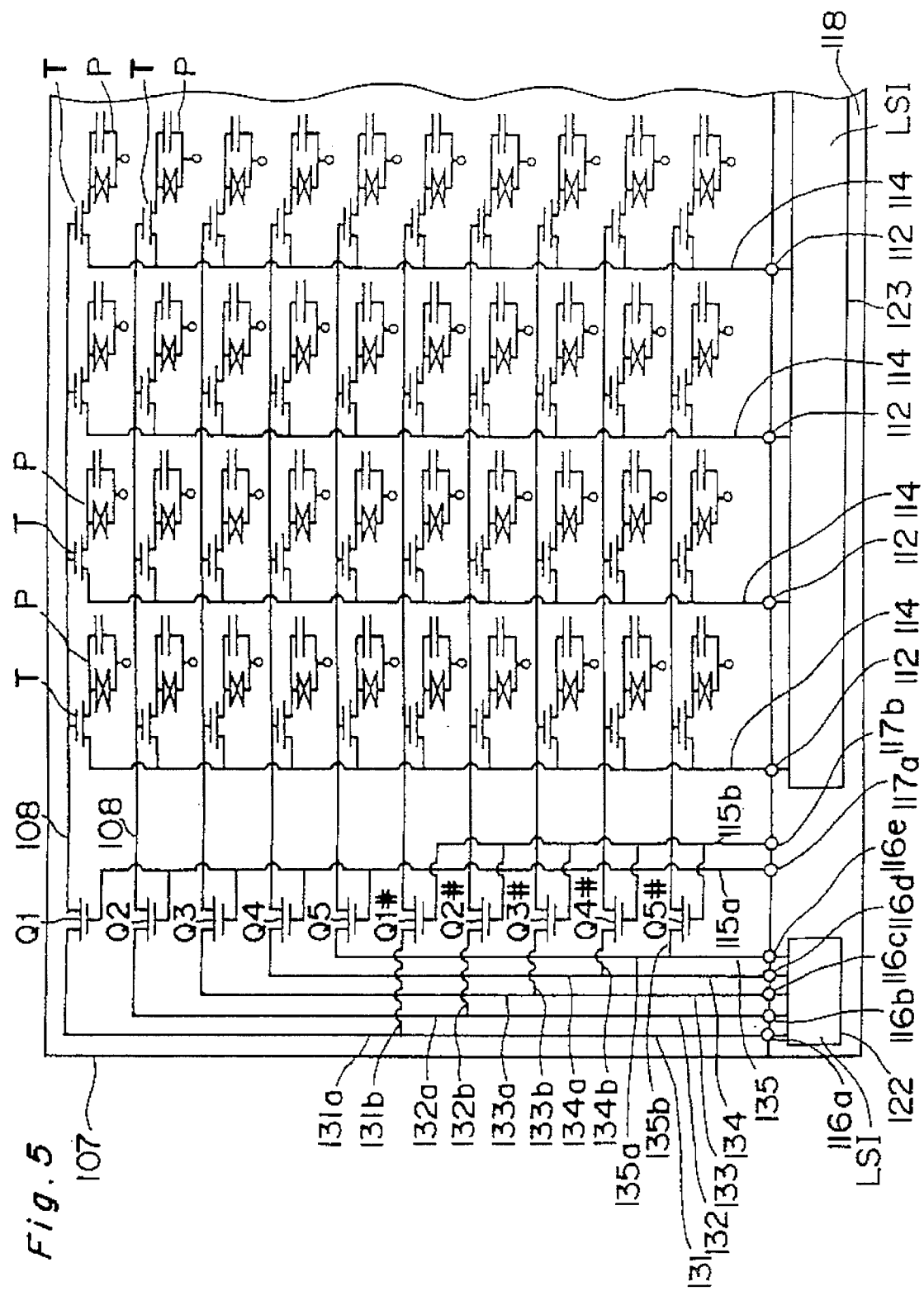

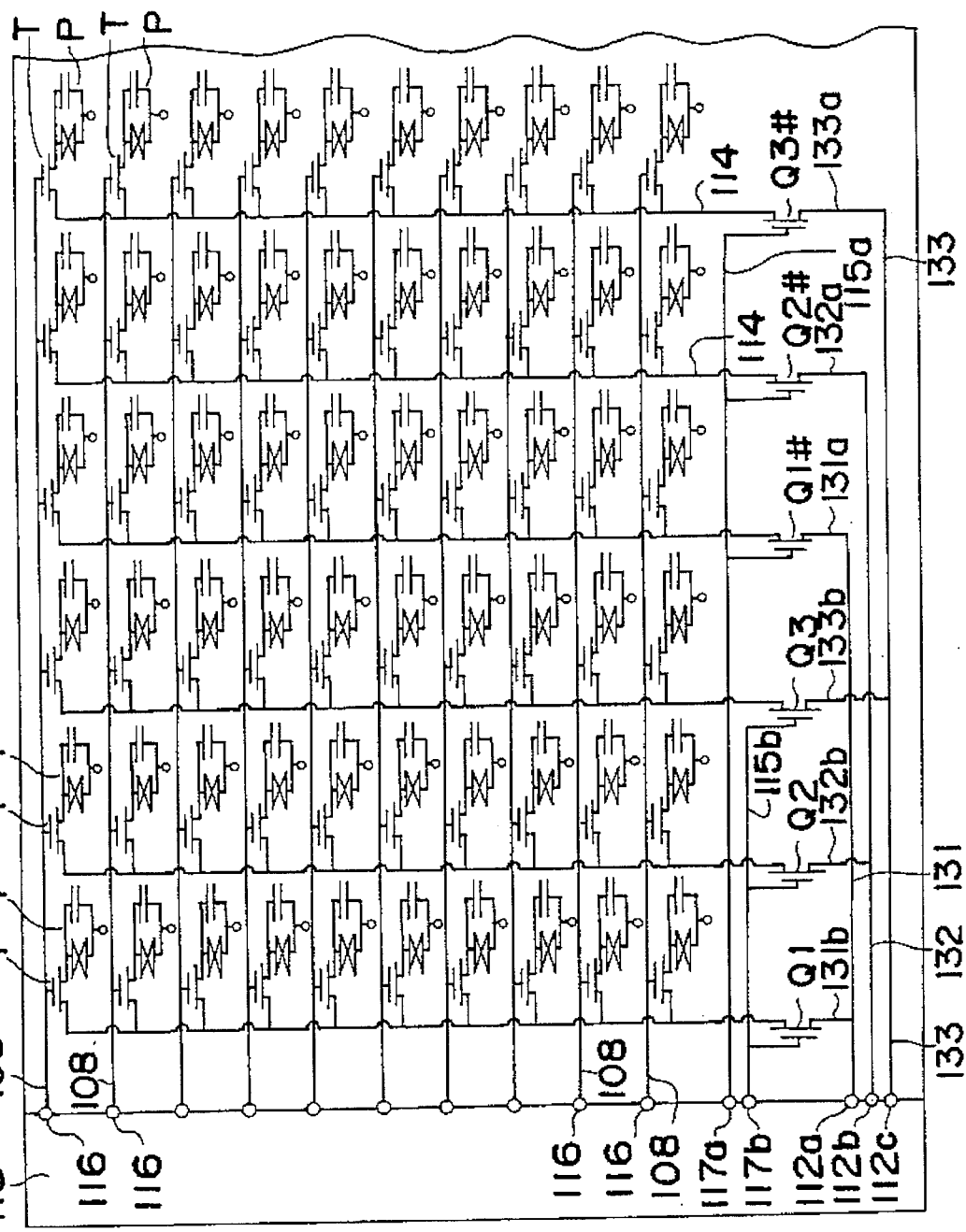

FIG. 23(a) VIDEO SIGNAL 311 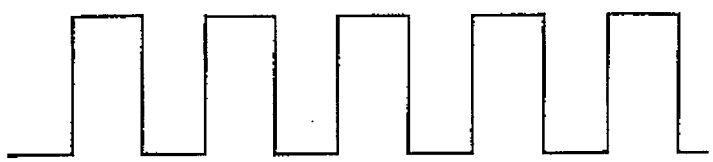
FIG. 23(b) SCANNING SIGNAL 312 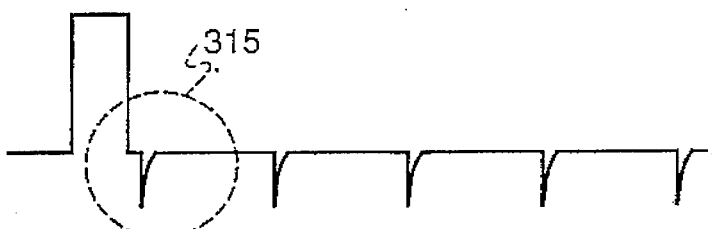
FIG. 23(c) INTERRUPTION CONTROL SIGNAL 313 
FIG. 23(d) SIGNAL 314 
FIG. 25(a) VIDEO SIGNAL 311 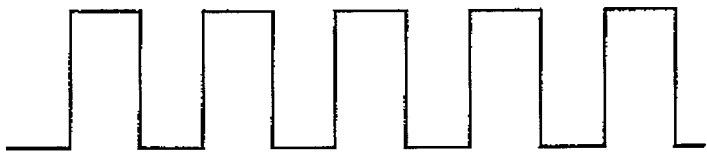
FIG. 25(b) SCANNING SIGNAL 312 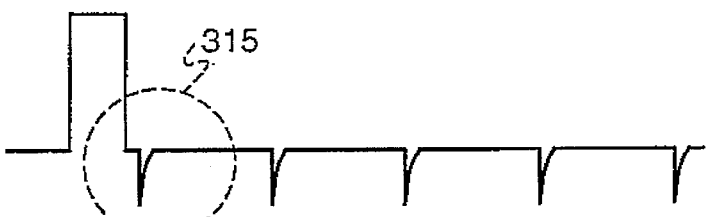
FIG. 25(c) INTERRUPTION CONTROL SIGNAL 313 
FIG. 25(d) SIGNAL 314 
FIG. 25(e) SWITCHING CONTROL SIGNAL 320 

VIDEO SIGNAL 311

SCANNING SIGNAL 312

SIGNAL 314

1

DISPLAY HAVING A SWITCHING ELEMENT FOR DISCONNECTING A SCANNING CONDUCTOR LINE FROM A SCANNING CONDUCTOR LINE DRIVE ELEMENT IN SYNCHRONIZATION WITH A LEVEL FALL OF AN INPUT VIDEO SIGNAL

This application is a continuation, of application Ser. No. 08/164,460 filed on Dec. 9, 1993, now abandoned.

BACKGROUND OF THE INVENTION

1. Field of the Invention

The present invention relates to a flat type display device employing liquid crystals, plasma, a thin film EL (Electro Luminescence), or the like driven through scanning of its display screen, such as a matrix type liquid crystal display device. It further relates to a driving method and an assembling method for the display device.

2. Description of the Prior Art

FIG. 1 shows a conventional thin film transistor (TFT) matrix type liquid crystal display device. The liquid crystal display device is constructed by arranging in a matrix form unit cells each composed of a pixel P and a thin film transistor T, one terminal of which is connected to the pixel P. The gates of the thin film transistors T, T, ... are connected to a scanning conductor line 8 in every row and the other terminals of the above-mentioned thin film transistors T, T, ... are connected to a display conductor line 14 in every column. Output signals at scanning signal output terminals 6, 6, ... of scanning drive LSI's (not shown) and output signals at display signal output terminals 12, 12, ... of display drive LSI's (not shown) are supplied to the scanning conductor lines 8, 8, ... and to the display conductor lines 14, 14, ...

In general, an output signal at one scanning signal output terminal 6 of a scanning signal is supplied to one scanning conductor line 8, as shown in FIG. 1. Therefore, for example, when 240 scanning conductor lines 8 are driven, the scanning drive LSI's are required to produce the same number of output signals, i.e., 240 output signals. In this case, when an LSI which produces 60 output signals is selected, four LSIs are to be provided. When an LSI which produces 80 output signals is selected, three LSIs are to be provided. When an LSI which produces 120 output signals is selected, two LSIs are to be provided.

Lately, flat type display devices such as liquid crystal display devices, have been in strong underselling competition, and therefore cost reduction has been a serious problem. Among others, the drive LSIs (scanning drive LSIs and display drive LSIs) are expensive and provide a great part of the total cost of the liquid crystal display device. Therefore the LSIs are the key parts for cost reduction.

In view of the above-mentioned fact, there have been trials to reduce chip size by making the pitch of output terminals finer or by increasing the number of output terminals per drive LSI to reduce the number of LSIs for the purpose of reducing the costs of the drive LSIs. However, none of the above-mentioned trials have been able to achieve sufficient cost reduction, rather, it is possible to lower the yield and reliability because a lot of terminals must be connected at a fine pitch on the board of the liquid crystal display device. The above-mentioned fact is common to devices such as simple-matrix display devices where its display signal system is scanned by means of a drive LSI.

FIG. 2 shows another display device wherein ramification conductor lines A, B, C, and D, one end of each ramification conductor line being connected to a scanning signal output terminal 6 and the other end thereof ramifying into n branches, are provided, and a three-terminal transistors $SW_{11}$ to $SW_{n4}$ are provided between the branches and corresponding scanning conductor lines G(1) through G(n) (Japanese Patent Publication No. 5-14915). The corresponding branches of the ramification conductor lines constitute a group, thus n groups of the branches are provided. FIG. 3 shows the waveforms of control signals for the display device shown in FIG. 2. In the display device of FIG. 2, n control conductor lines E(1) through E(n) connected to the gates of the transistors $SW_{11}$-$SW_{n4}$ are sequentially selected (electric potential is made to be positive (+V)) to sequentially select the groups of the branches, and the ramification conductor lines A, B, C, and D are sequentially selected when each group of the branches is selected to thereby select the corresponding scanning conductor lines in each group as shown in FIG. 3. With the above-mentioned operation, the scanning conductor lines are selected group by group. Meanwhile, when the transistors $SW_{11}$ to $SW_{n4}$ are turned off, transistors $P_1$ through $P_N$ connected to the corresponding scanning conductor lines G(1) through G(N) are turned on (by signals I and J), and a constant voltage is applied to the scanning conductor lines G(1) through G(N) to achieve sufficient discharge of electricity.

In the display device shown in FIG. 2, the number of connection terminals of the scanning line drive circuit 5 is smaller than the number of the scanning conductor lines G(1) through G(N). However, since the whole length of the conductor lines arranged between the scanning line drive circuit 5 and a display board 1 are long, the resistance of the conductor lines made of a thin film increases, and therefore the conductor lines may catch noise to cause the malfunction of the display device or the deterioration of the display image quality.

Furthermore, in the display device shown in FIG. 2, since the scanning line drive circuit 5 and the signal line drive circuit 2 are arranged in two different directions with respect to the display board 1, two connection steps are required for the connection between the display board 1 and the drive circuit boards. When occasion demands, a junction board 9 for transmitting timing signals and other signals must be provided, and therefore connection between the junction board and the drive circuit boards is required.

FIG. 4 shows a display device assembling process where the display device shown in FIG. 2 is coupled with a junction board.

First, a connection material (anisotropic conductive film or the like) for connecting display conductor lines S(1) through S(M) on the display board (display panel) 1 with the signal line drive circuit 2 is supplied to either the display board 1 or to a signal line drive circuit board (not shown) (step S1).

Then the signal line drive circuit board is placed adjacently along a side of the display board 1. That is, the signal line drive circuit board is aligned with the display board 1 (step S2). Then the signal line drive circuit board is connected with the display board so that the display conductor lines S(1) through S(M) on the display board 1 and output terminals of the signal line drive circuit 2 are connected with each other by way of the connection material (step S3). Then the display board 1 is turned by an angle of 90° (step S4).

In the same manner as described above, the ramification conductor lines A, B, C, and D, the control conductor lines E(1) through E(n), and the other conductor lines on the display board 1 are connected with output terminals of the scanning line drive circuit 5 by means of a connection material (steps S5–S7). Then the display board 1 with the signal line drive circuit board and the scanning line drive circuit board is transferred (step S8).

Subsequently, a connection material is supplied to either the junction board or the scanning line drive circuit board (step S9), alignment of both boards is performed (step S10), and conductor lines of the junction board are connected to the input terminals of the scanning line drive circuit 5 (step S11). Then the display board 1 in this condition is transferred (step S12). In the same manner as described above, a connection material is supplied to either the junction board or the signal line drive circuit 2 (step S13), alignment of both boards is performed (step S14), and conductor lines of the junction board are connected to the input terminals of the signal line drive circuit 2 (step S15). As described above, there are problematically many processes for the assembling (note that the alignment process at step S14 can be eliminated).

As is evident from the above, the assembling procedure has a lot of steps and is troublesome. This results in a cost increase.

Furthermore, since the conductor lines A–D, E(1)–E(n), and I and J occupy a wide non-display area on the display board and also since the circuit extends in two directions with respect to the display screen, the resulting module disadvantageously has a large size and heavy weight after assembling.

Furthermore, since the operation frequencies of the transistors $P_1$ through $P_N$ are high, they possibly operate faultily.

Furthermore, the display device shown in FIG. 2 has many intersections of the conductor lines, which results in a reduced yield of the products.

SUMMARY OF THE INVENTION

An object of the present invention is therefore to provide a display device and a driving method and an assembling method for the display device capable of reducing the number of drive LSIs to be employed without reducing the yield, simplifying the assembling procedure, achieving cost reduction, allowing a small-size light-weight construction of the module after assembling, and achieving a stable operation.

Another object of the present invention is to produce a low-cost, high-reliability display device having a reduced number of drive LSIs which offers a high-definition display panel by utilizing conventional connection materials and conventional equipments.

A further object of the present invention is to provide a device capable of remarkably increasing the display quality and reliability by avoiding any bad influence possibly exerted on drive elements at the time of instantaneous voltage drop of the scanning signal occurring when a video signal falls from a high level "H" to a low level "L".

In order to accomplish the first object, the present invention provides a display device wherein unit cells each comprising a pixel are arranged in a matrix form on a display board, the unit cells in rows being connected to scanning conductor lines, the unit cells in columns being connected to display conductor lines intersecting the scanning conductor lines. At least one scanning drive LSI supplies scanning signals from scanning signal output terminals thereof toward the scanning conductor lines to scan the pixels row by row. Further, at least one display drive LSI supplies display signals from display signal output terminals thereof toward the display conductor lines. Thus, an image represented by the display signals is displayed. The display device comprises:

ramification conductor lines each having a first end and a second end ramified into a predetermined number of branches, said first ends being respectively connected to at least ones of the scanning signal output terminals and the display signal output terminals;

first switching elements provided between the branches of said ramification conductor lines and the scanning conductor lines corresponding to said branches, or between the branches of said ramification conductor lines and the display conductor lines corresponding to said branches, or both between the branches of said ramification conductor lines and the scanning conductor lines corresponding to said branches and between the branches of said ramification conductor lines and the display conductor lines corresponding to said branches, said first switching elements being turned on and off in response to a control signal received at respective control terminals thereof;

control conductor lines connected to said control terminals of said first switching elements; and control means for supplying said control conductor lines with said control signal to turn on and off said first switching elements, said scanning signal output terminals being substantially aligned with said display signal output terminals, the conductor lines positioned between the cell units and either the scanning signal output terminals or the display signal output terminals bending such that the conductor lines are respectively connected with corresponding ones of the scanning and display output terminals.

In one embodiment, the first ends of said ramification conductor lines are respectively connected to the scanning signal output terminals. In this case, the first switching elements are provided between the branches of said ramification conductor lines and the scanning conductor lines, and the conductor lines positioned between the cell units and the scanning signal output terminals bend substantially at a right angle toward the direction of the rows. The conductor lines that bend may be the ramification conductor lines or the scanning conductor lines. It should be noted that "bending of the ramification conductor line substantially at a right angle" includes a case wherein a branch thereof perpendicularly ramifies from the stem of the ramification conductor line.

In this display device, the output signal (output terminal) of the scanning drive LSI is ramified into a specified number of the branches to be supplied to the scanning conductor lines corresponding in number to the branches via the first switching elements. As a result, the scanning conductor lines corresponding in number to the branches are driven per output terminal of the scanning drive LSI. Therefore, the number of scanning drive LSIs to be employed can be reduced to a reciprocal of the number of branches, which leads to a remarkable cost reduction. Furthermore, it is neither necessary to make finer the pitch of the output terminals of the drive LSI nor to increase the number of the output terminals per drive LSI, and therefore the yield is not reduced. Rather the yield increases because the connection portions of the drive LSIs are reduced in number as a whole. Furthermore, since the conductor lines positioned between the cell units and the scanning signal output terminals, specifically, either the ramification conductor lines or the scanning conductor lines, bend substantially at a right angle toward the direction of the rows, the scanning signal output terminals are arranged on a line extending from the array of the display signal output terminals along a side of the display board. Therefore, the display drive LSI and the scanning drive LSI can be mounted on the same drive circuit board along a side of the display board. When the above-mentioned arrangement is adopted, only one connection process is required to connect the display board with the drive circuit board, which leads to a simple assembly procedure. When a junction board is provided to transmit a timing signal and other signals, the number of steps for connecting the junction board with the drive circuit board is reduced as the number of the drive circuit boards to be connected is reduced, which curtails the assembly procedure, when compared with a conventional case wherein drive circuit boards are connected with different sides of the display board. The reduction of the connection steps further reduces the cost as compared with the conventional case. Furthermore, since the drive circuit board is provided along only a side of the display board, the resulting module has a small size and light weight.

According to an aspect of the invention, the adjacent scanning conductor lines of the number of the scanning signal output terminals constitute a group, the adjacent scanning conductor lines of each group correspond to the same nth branches (0<n≦ the number of the scanning signal output terminals) of said ramification conductor lines, said same nth branches of said ramification conductor lines constituting a group, and the branches corresponding to the scanning signal output terminals in each group are disposed in the same order.

Each control conductor line may be commonly connected to the control terminals of the first switching elements connected to each group of the same nth branches of said ramification conductor lines. In this display device, the scanning drive LSI generates successively a pulse output signal in a specified cycle at the scanning signal output terminals, and the control means generates on the control conductor line a control signal in synchronization with the output signal of the scanning drive LSI, said control signal having a cycle obtained by multiplying the cycle of the output signal of the scanning drive LSI by the number of the branches of one ramification conductor line to turn on and off the first switching elements group by group. Such an arrangement allows scanning of every group of the scanning conductor lines corresponding to the same nth branches of each ramification conductor line. For example, a group of the first switching elements connected to the first branches of each ramification conductor line are turned on while the other first switching elements are turned off. With this operation, the scanning conductor lines in the group corresponding to the first branch of each ramification conductor line are selected. In this condition, the scanning conductor lines in the group are driven by the output signals of the scanning drive LSI. Then the first switching elements in a group connected to the second branches of each ramification conductor line are turned on while the other first switching elements are turned off so that the scanning conductor lines in the group corresponding to the second branches of each ramification conductor line are selected. In this condition, the scanning conductor lines in the group are driven by the output signals of the scanning drive LSI. Thus many scanning conductor lines are successively driven by a relatively small number of output signals. Therefore, the number of scanning drive LSIs and therefore the costs can be remarkably reduced as compared with the conventional case. Furthermore, because the common control conductor lines are used, it is possible to reduce a wiring space, that is, a space occupied by the conductor lines.

The first ends of said ramification conductor lines may be respectively connected to the display signal output terminals. In this case, the first switching elements may be provided between the branches of said ramification conductor lines and the display conductor lines, and the conductor lines positioned between the cell units and the display signal output terminals, more specifically either the ramification conductor lines or the display conductor lines, bend substantially at a right angle toward the direction of the columns. Also, similarly to the case wherein the first ends of the ramification conductor lines are connected to the scanning signal output terminals, the adjacent display conductor lines of the number of the display signal output terminals may constitute a group, the adjacent display conductor lines of each group may correspond to the same mth branches (0<m≦ the number of the display signal output terminals) of said ramification conductor lines, said same mth branches of said ramification conductor lines constituting a group, and the branches corresponding to the display signal output terminals in each group may be disposed in the same order. Further, each control conductor line may be commonly connected to the control terminals of the first switching elements connected to each group of the same mth branches of said ramification conductor lines. It will be easily understood that those arrangements can offer advantages similar to those obtained in the case that the first ends of said ramification conductor lines are connected to the scanning signal output terminals.

If the ramification conductor lines are connected to both the scanning signal output terminals and the display signal output terminals, the number of drive LSIs to be adopted can be further reduced.

According to an embodiment of the present invention, each of said unit cells comprises the pixel and a switching element, one terminal of which switching element is connected to the pixel and a control terminal of which switching element is connected to the scanning conductor line, and each scanning conductor line is connected to an external power terminal having a voltage sufficient to turn off the switching element of each unit cell via an off voltage supply line connected said external power terminal and a second switching element connected between said off-voltage supply line and the scanning conductor line, said second switching element being turned on and off by a control signal received at its control terminal. In the display device, the control signals for turning on the second switching elements are continuously applied to the control terminals of the second switching elements when the first switching elements connected to the scanning conductor lines are turned off. Therefore, the electric charge on the scanning conductor lines is sufficiently discharged, with which the electric potential at the scanning conductor line is controlled to have a value for turning off the switching element of each unit cell. Therefore, a stable display operation is achieved.

The switching element of each unit cell may be a thin film transistor or a thin film rectifying element.

The second switching elements connected to the group of the adjacent scanning conductor lines may be connected to a common control conductor line at the control terminals thereof. In this case, the second switching elements are controlled to be turned on and off group by group. Therefore, a low operation frequency is achieved as compared with the transistors $P_1$ through $P_N$ shown in FIG. 2 to assure a stable operation of the display device.

The first and second switching elements may be formed of thin film transistors or thin film rectifying elements. Then, the switching elements can be easily formed by an ordinary display device manufacturing process. Therefore, production of those switching elements does not increase the cost.

In an embodiment of the invention, a drive circuit board on which the scanning drive LSI and the display drive LSI are mounted is arranged adjacently along a side of the display board. The scanning signal output terminals of the scanning drive LSI and the display signal output terminals of the display drive LSI on said drive circuit board are connected with the corresponding conductor lines on said display board directly or by way of a junction board having substantially parallel conductor lines thereon. When they are directly connected, only one connection process is required to connect the display board with the drive circuit board, which leads to a simple assembly procedure. Even though they are connected by way of the junction board having the substantially parallel conductor lines to transmit a timing signal or other signals, the number of connection steps for connecting the junction board with the drive circuit board is reduced as compared with the conventional case, since the drive circuit board is placed only on one side of the display board. Therefore, the present invention further reduces the production costs as compared with the conventional case. Furthermore, the drive circuit board and other components are provided along a side of the display board, the resulting module has a small size and light weight.

The scanning drive LSI and display drive LSI may be provided on the display board, instead of being provided on the separate drive circuit board. In this case, each of the drive LSIs may have a power input terminal and a control signal input terminal, a control board having conductor lines for supplying a power and a control signal to each of the drive LSIs may be arranged adjacently along a side of said display board, and the conductor lines on said control board may be connected with said input terminals of each of the drive LSIs or conductor lines formed on said display board and connected to said input terminals directly or by way of a junction board having substantially parallel conductor lines thereon. Because the control board and the junction board are connected with only one side of the display board, the assembly procedure becomes simpler. Therefore, the production costs are lower as compared with the conventional case. Furthermore, since the control board and other components are provided along only one side of the display board, the resulting module has a small size and light weight.

The display device according to the above aspects of the present invention where the scanning and display drive circuits are mounted on the drive circuit board can be assembled in the following manner. First, the drive circuit mounted with the drive LSIs is prepared, and a connection material for connecting the conductor lines of the display board with the output terminals of the drive LSIs is supplied to either the display board or the drive circuit board. Then, the drive circuit board is arranged adjacently along the side of the display board, and the conductor lines on the display board are collectively connected with the respective output terminal on the drive circuit board by means of the connection material. When the junction board is used, the connection material may be supplied to the parallel conductor lines of the junction board. The junction board and the drive circuit board are arranged adjacently along the side of the display board, and the conductor lines on the display board and the output terminals on the drive circuit board are collectively connected with the parallel conductor lines of the junction board by means of the connection material. As is obvious, the number of steps for assembly is fewer as compared with the conventional case.

On the other hand, the display device of the present invention where the scanning and display drive circuits are mounted on the display board can be assembled in the following manner. A connection material for connecting the input terminals of each of the drive LSIs with the conductor lines for supplying a power and a control signal of the control board is supplied to the display board or the control board. The control board is arranged adjacently along a side of the display board, and the conductor lines on the control board are collectively connected with the input terminals of each of the drive LSIs or the conductor lines on the display board connected to the input terminals by means of the connection material.

When the junction board is used, the connection material is supplied to the parallel conductor lines of the junction board. The junction board and the control board are arranged adjacently along a side of the display board, and the conductor lines on the control board and the input terminals of each of the drive LSIs or the conductor lines on the display board connected to the input terminals are collectively connected with the parallel lines on the junction board by means of the connection material. As is obvious, the display device can be easily assembled in fewer steps as compared with the conventional case even when the junction board is interposed.

In order to accomplish the above object, the present invention further provides a display device having a display panel board formed with signal transmission conductor lines and at least one flexible board mounted with a drive LSI for supplying an output signal to the signal transmission conductor lines to drive a display panel. The flexible board comprises an output conductor line connected with an output terminal of the drive LSI for transmitting the output signal from the drive LSI to an end of the flexible board; and a first connection terminal formed at an end of the output conductor line. Further, the display panel board comprises a ramification conductor line ramified into a plurality of branches at one end thereof; a switching element interposed between each of the branches of the ramification conductor line and the corresponding signal transmission conductor line for connection and disconnection therebetween, said switching element being turned on and off by a control signal; a control conductor line for supplying said control signal to the switching element; and a second connection terminal formed at an unramified end of the ramification conductor line and connected with said first connection terminal for receiving the output signal of the drive LSI through the output conductor line.

In this display device, an output signal from the drive LSI formed on the flexible board is transmitted to the first connection terminal by way of the output conductor line. After being transmitted to the second connection terminal of the display panel board, the output signal is ramified into a plurality of paths by the ramification conductor line connected to the second connection terminal.

At this time, if any of the switching elements interposed between the branches of the ramification conductor line and the corresponding signal transmission conductor lines is turned on by the control signal supplied to the control conductor line, the output signal from the drive LSI is supplied to the signal transmission conductor line corresponding to the switching element turned on to drive the display panel.

As described above, one output signal output from the drive LSI is supplied to a plurality of signal transmission conductor lines through the ramification conductor line. As a result, the display panel is driven by a small number of the drive LSIs. In the above case, since one connection terminal is connected to a plurality of the signal transmission conductor lines, the pitch of the connection terminals can be made greater than the pitch of the signal transmission conductor lines. If the drive LSIs to be mounted are not reduced in number, a high-definition display panel having a smaller pitch of the signal transmission conductor lines is easily produced and driven with high reliability.

According to the present invention, existing connection materials, connection equipments, and flexible boards carrying a drive LSI can be employed. Therefore, investments for development of new connection materials and/or flexible boards and investments for new equipments are not necessary.

Furthermore, according to the present invention, since the wiring pattern area does not so expand, the size of the display panel can be decreased.

Furthermore, it is possible to subject the display panel to interlace scanning by controlling the switching elements on the branches of each ramification conductor line to operate by turns. Therefore, an image can be displayed on the display panel based on the television broadcasting wave transmitted according to the interlace scanning system without any signal processing.

Furthermore, the wiring or conductor lines include fewer crossing portions as compared with the conventional active-matrix circuit board as shown in FIG. 2. Therefore a better yield of products is achieved.

In an embodiment of the invention, the display panel board further comprises a third connection terminal provided at an end of the control conductor line, and said third connection terminal is connected with a fourth connection terminal provided at an end portion of a circuit board across which a conductive line connected with said fourth connection terminal extends. In this embodiment, the control signal for controlling the turning-on and turning-off of the switching elements is supplied to the control conductor line from the circuit board which is different from the flexible board as a separate structure. Accordingly, an existing or commercially available flexible board carrying a drive LSI can be used as it is for the display device of the invention, and therefore the display device which allows reduction in number of the drive LSIs and high-definition display panel can be provided without increasing the costs.

In another embodiment, the fourth connection terminal and the conductor line connected on the fourth connection terminal are provided on the at least one flexible board. In this embodiment, the control signal supplied to the conductor line on the at least one flexible board is transmitted to the control conductor line on the display panel board via the fourth and third connection terminals connected to each other. When there are provided a plurality of the flexible boards, the flexible boards of the same design can be used if the fourth connection terminal provided on the flexible boards other than the at least one flexible board is not connected with the third connection terminal on the display panel board. Therefore, the display device can be produced at low costs.

In a still another embodiment, the flexible boards other than said at least one flexible board have neither the fourth connection terminal nor the conductor line connected to the fourth connection terminal. In this case, an unnecessary area for the unused fourth connection terminal and conductor line is excluded from the flexible boards, so that lightening and size reduction of the modules is achieved.

The flexible board with the fourth connection terminal and the conductor line connected to the fourth connection terminal can be produced by forming a continuous flexible board having a plurality of sets of the conductor lines of the same pattern and the first and fourth connection terminals, then mounting a plurality of the drive LSIs on the continuous flexible board, and then dividing the continuous flexible board into the individual flexible boards such that the fourth connection terminal and the conductor line connected thereto are included in the individual flexible board. On the other hand, the flexible board without the fourth connection terminal and the conductor line connected thereto can be produced by dividing said continuous flexible board having the conductor lines, the connection terminals and the LSIs into the individual flexible boards such that the fourth connection terminal and the conductor line connected thereto are excluded from the individual flexible board. Advantageously, such a production method can utilize a conventional flexible board production process and conventional production equipments with a minimum change. Accordingly the plant investment can be suppressed as much as possible.

Commercially available flexible boards generally have dummy terminals. Accordingly, the fourth connection terminal can be obtained by utilizing such a dummy terminal preliminarily provided on a flexible board. In this case, the flexible boards for use in the display device of the invention are obtained by subjecting the commercially available or existing flexible boards to a minimum amount of change in design. In addition, the design rule for the connection terminals of the flexible board is not required to be changed very much. Therefore, the display device can be produced at low costs.

The control signal for the switching elements may be supplied from outside via the fourth connection terminal and the conductor line connected thereto in some cases. Alternately, it may be supplied from the flexible board per se. For this purpose, in an embodiment of the invention, the drive LSI on the flexible board having the fourth connection terminal and the conductor line connected to the fourth connection terminal at one end thereof has a built-in control signal generating circuit for generating the control signal. The other end of the conductor line is connected to an output terminal of the control signal generating circuit. In this case, a minimum change of the external control board is required.

In order to accomplish the third object, the present invention provides a display device having on a substrate a plurality of scanning conductor lines and a plurality of signal conductor lines intersecting the scanning conductor lines, a first switching element formed at each intersection between the scanning conductor lines and the signal conductor lines, a scanning conductor line drive element for driving the scanning conductor lines, and a signal conductor line drive element for driving the signal conductor lines. The display device includes a second switching element which is provided between each scanning conductor line and the scanning conductor line drive element, and the second switching element is put into an open state in synchronization with a fall in level of a video signal given to the signal line to electrically disconnect the scanning conductor line from the scanning conductor line drive element.

When the second switching element is put in an open condition, that is, turned off, the signal conductor line is electrically disconnected from the scanning conductor line drive element. Therefore, by temporarily turning off the second switching element in synchronization with the fall in level of the video signal given to the signal conductor line, an instantaneous voltage drop occurring to the signal conductor line due to the fall in level of the video signal from "H" to "L" is not transmitted to the scanning conductor line drive element.

As a result, various signals in the scanning conductor line drive element can be maintained in a stable state. Therefore, a possible faulty operation of the scanning conductor line drive element and total breakdown of the element due to a voltage exceeding the endurance voltage of the element can be prevented.

Furthermore, a momentary change of voltage in the signals in the scanning conductor line drive element due to the instantaneous voltage drop is avoided, and therefore a great voltage difference between an ON voltage and an OFF voltage of the first switching element can be assured within the range of the endurance voltage of the scanning conductor line drive element. Thus, the display quality can be improved.

It is possible that the electric potential at each scanning conductor line becomes unstable to insufficiently turn off the first switching element when the scanning conductor line is disconnected from the scanning conductor line drive element. Such a possibility can be avoided by a display device further comprising an external power input terminal connected to an external power source having an OFF voltage sufficient to turn off the first switches, and a third switching element provided on each scanning conductor line for switching a signal to be transmitted through each scanning conductor line between a scanning signal supplied from the scanning conductor line drive element and the OFF voltage, wherein the second switching element is in an open state, a switching control signal is given to an input terminal of the third switching element so that the OFF voltage is supplied to the scanning conductor line to sufficiently turn off the first switching element.

With this structure, the first switching element is sufficiently turned off to easily solve the above-mentioned problem.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4, 4A and 4B are flow charts of the assembly process of the liquid crystal display device shown in FIG. 2;

FIG. 5 is a circuit diagram of an active-matrix type liquid crystal display device in accordance with an embodiment of the present invention;

FIG. 5A is a circuit diagram of another embodiment of the display device of the present invention;

FIG. 23 is a timing chart showing the timing of turning on and off various signals in the active-matrix display device shown in FIG. 22;

FIG. 25 is a timing chart showing the timing of turning on and off various signals in the active-matrix display device shown in FIG. 24.

DETAILED DESCRIPTION OF THE PREFERRED EMBODIMENTS

Figure 1:
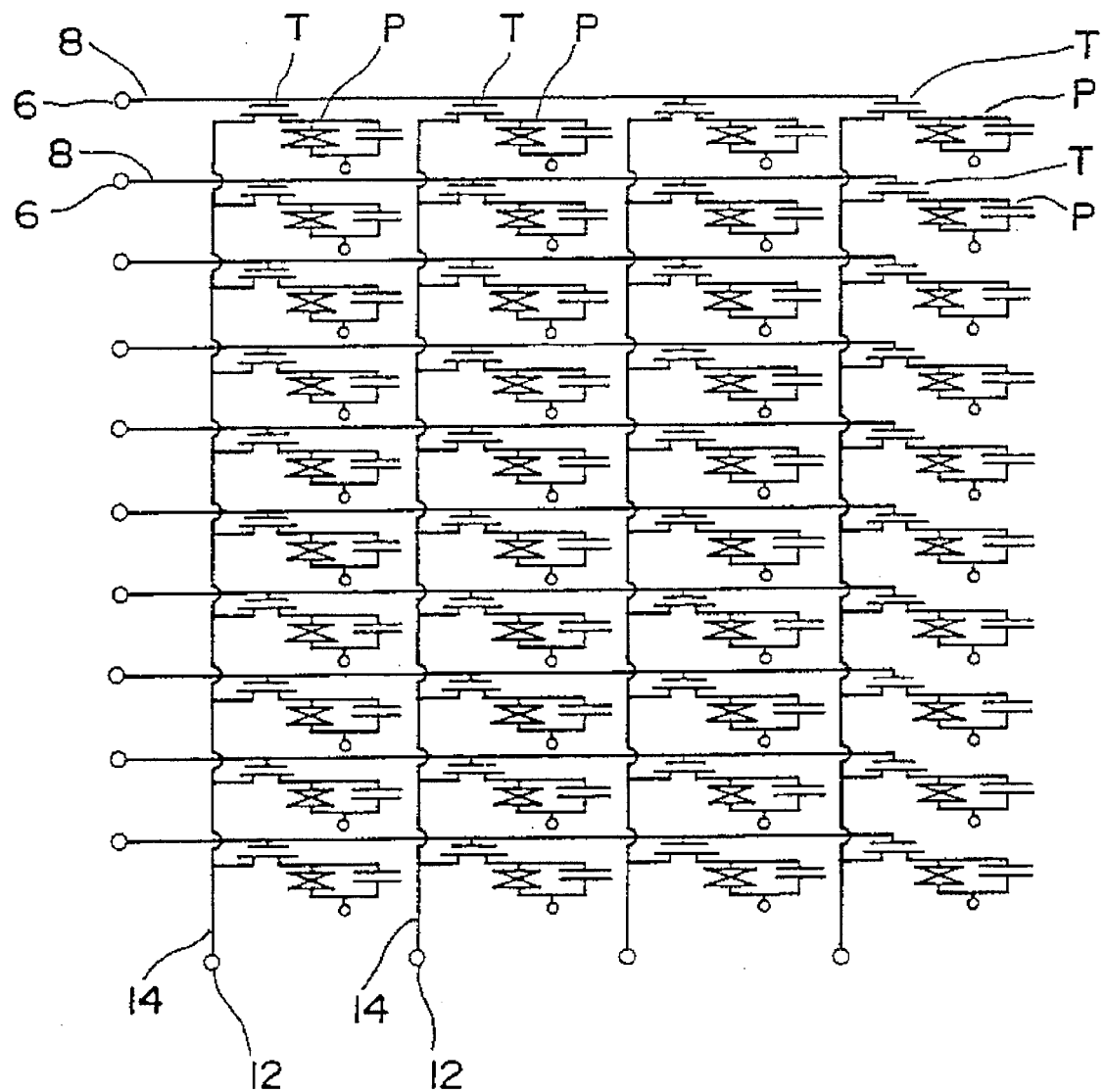
FIG. 1 is a diagram showing a display section of a conventional active-matrix type liquid crystal display device.
Figure 2:
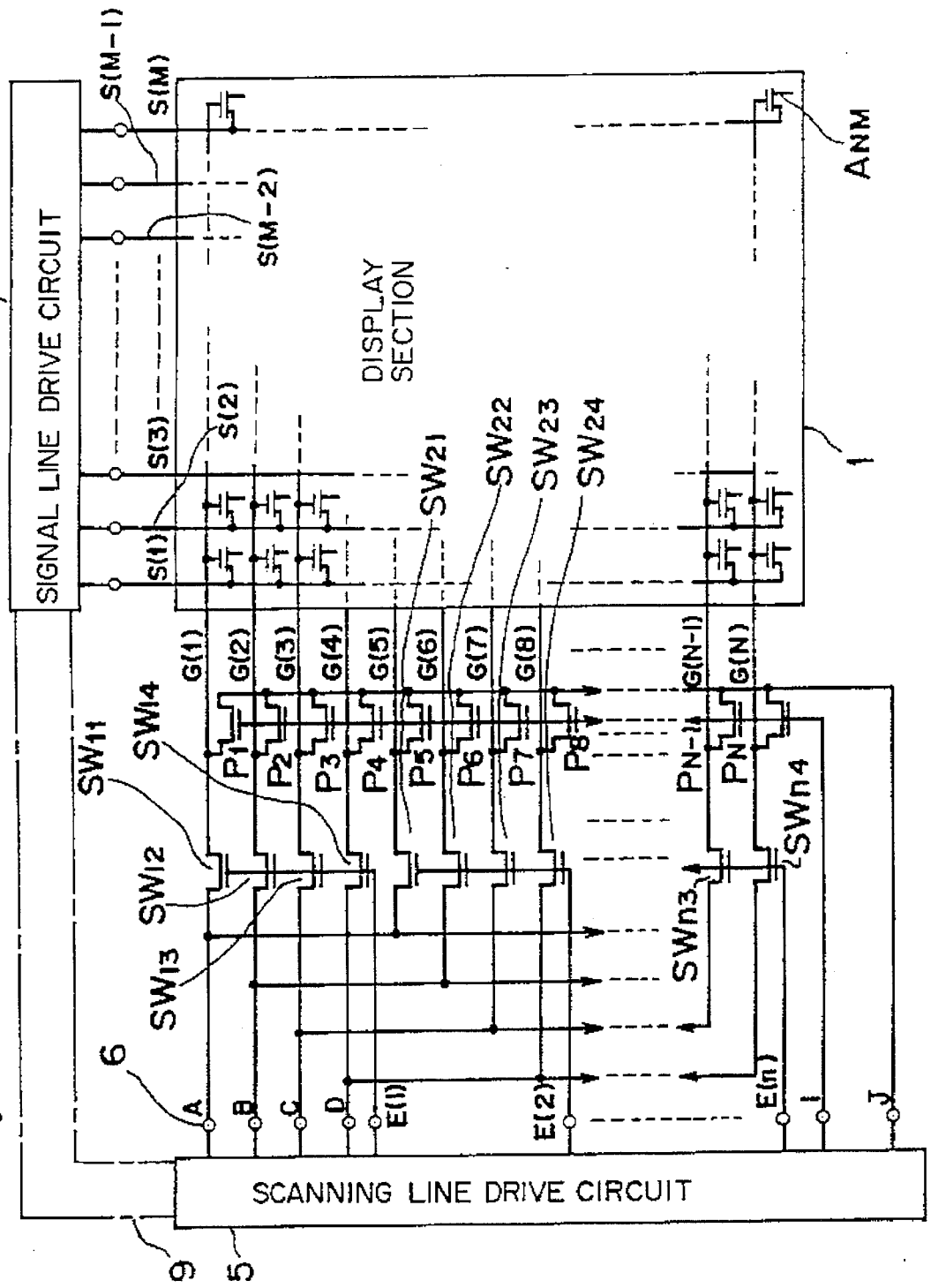
FIG. 2 is a circuit diagram showing the construction of another conventional active-matrix type liquid crystal display device.
Figure 3:
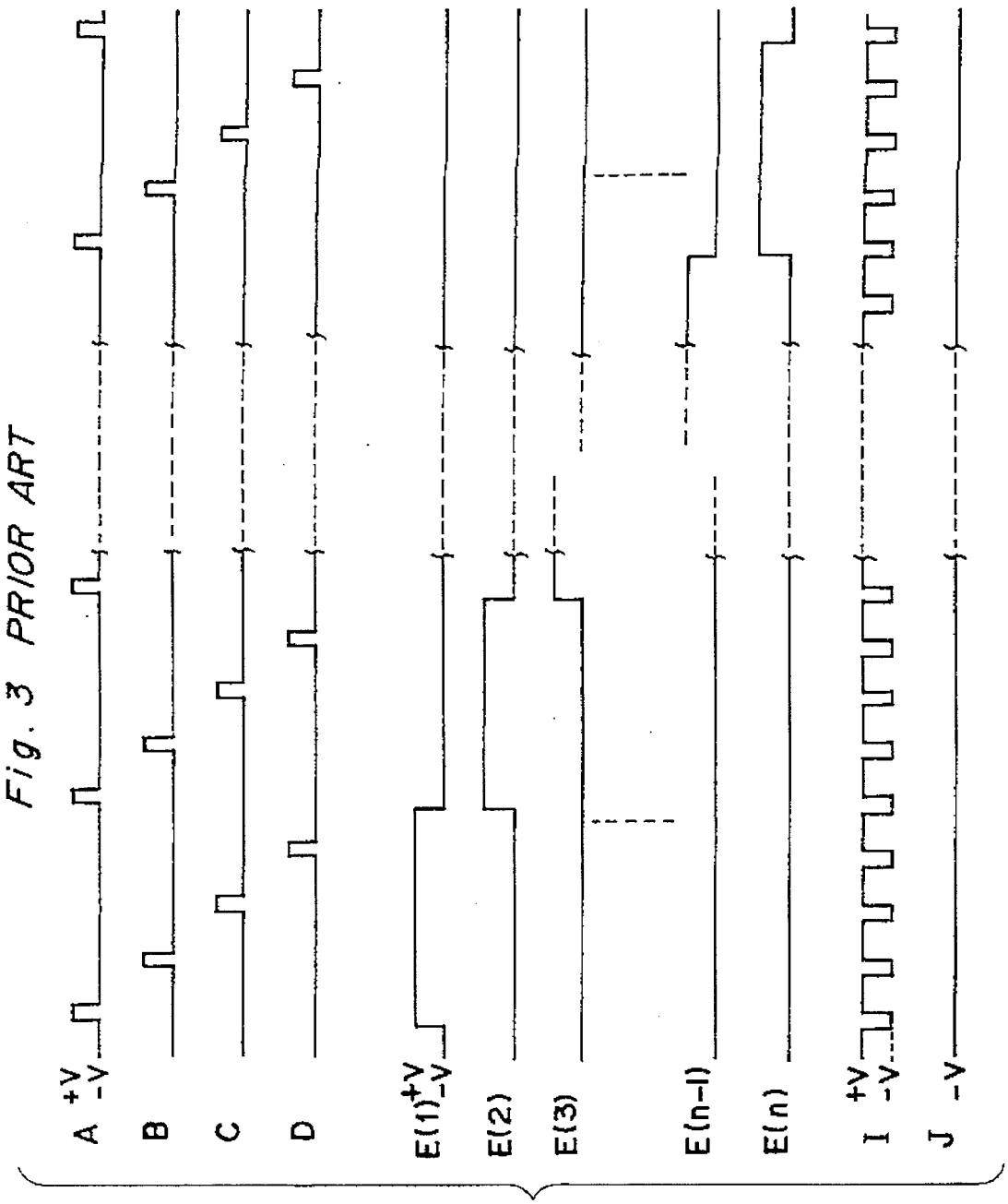
FIG. 3 is a timing chart of control signals of the liquid crystal display device shown in FIG. 2.
Figure 4B:
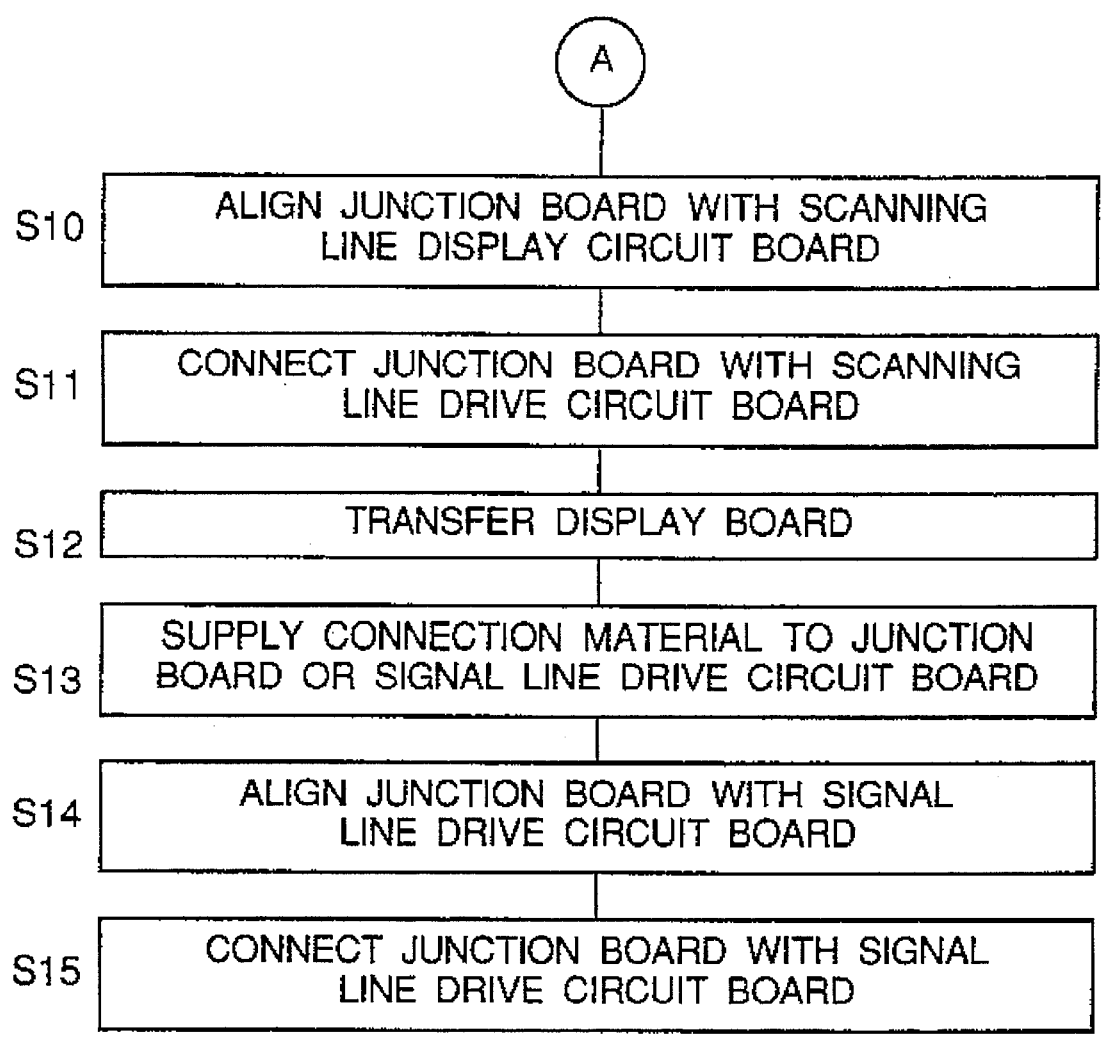

FIG. 5 shows a TFT matrix type liquid crystal display device in accordance with an embodiment of the present invention. In the present liquid crystal display device, unit cells each composed of a pixel P and a thin film transistor T connected to the pixel P at one terminal are arranged in a matrix form on a display board 107. A thin film rectifying element may be used instead of the thin film transistor T. The gates of the thin film transistors T, T, . . . in every row are connected to a scanning conductor line 108 extending in the direction of the row, while the other terminals of the thin film transistors T, T, . . . in every column are connected to a display conductor line 114 extending in the direction of the column. Further a drive circuit board 118 on which a scanning drive LSI 122 and a display drive LSI 123 are mounted is provided adjacently along a side of the display board 107 intersecting perpendicularly to the display conductor lines 114. The above-mentioned display drive LSI 123 yields an output signal representing image data at its display signal output terminals 112, 112, . . . arranged along a side adjacent to the display board 107 of the drive circuit board 118. The display conductor lines 114, 114, on the display board 107 are connected to the display signal output terminals 112, 112, . . . Meanwhile, the aforementioned scanning drive LSI 122 yields an output signal for scanning at its scanning signal output terminals 116*a*, 116*b*, 116*c*, 116*d*, 116*e* substantially aligned with the display signal output terminals 112, 112, . . . on the drive circuit board 118. The scanning signal output terminals 116*a*–116*e* are respectively connected to ends of ramification conductor lines 131, 132, 133, 134, and 135 provided on the display board 107. The ramification conductor lines 131 through 135 are arranged in the direction of the column on a side of the cell array, where the other ends of the ramification conductor lines 131–135 are respectively bifurcated into two branches 131*a* and 131*b*; 132*a* and 132*b*; 133*a* and 133*b*; 134*a* and 134*b*; and 135*a* and 135*b*. The ramification conductor lines 131–135 bend substantially at a right angle toward the scanning conductor lines 108. More specifically, the ramification conductor line branches 131*a*, 132*a*, 133*a*, 134*a*, 135*a* extend in the direction of the column by a specified length and bend at an angle of 90° to extend toward the corresponding rows of the cell array. On the other hand, the ramification conductor line branches 131*b*, 132*b*, 133*b*, 134*b*, 135*b* directly extend toward the corresponding rows of the cell array from the ramification points. The adjacent scanning conductor lines 108 of the number of the scanning signal output terminals (five in this case) constitute a group, and the adjacent scanning conductor lines of each group correspond to the same nth branches (0<n≦ the number of the scanning signal output terminals) of the ramification conductor lines. The same nth branches 131*a*–135*a*; 131*b*–135*b* of said ramification conductor lines 131–135 constitute a group, and the branches 131*a*–135*a*; 131*b*–135*b* corresponding to the scanning signal output terminals in each group are disposed in the same order. In other words, the paired ramification conductor line branches 131*a* and 131*b*; . . . ; and 135*a* and 135*b* correspond to scanning conductor lines 108 and 108 in the rows separated apart from each other by the number (five in the present example) of the output signals of the scanning drive LSI 122. Further, thin film transistors Q1, Q1#; Q2, Q2#; Q3, Q3#; Q4, Q4#; Q5 and Q5# are provided as first switching elements between the paired ramification conductor line branches 131*a* and 131*b*; . . . ; and 135*a* and 135*b* and the scanning conductor lines corresponding to the ramification conductor line branches. The gates of the thin film transistors Q1, Q2, . . . , Q5 in a group are connected to a control conductor line 115*a*, while the gates of the thin film transistors Q1#, Q2#, . . . , Q5# in another group are connected to a control conductor line 115*b*. The thin film transistors Q1–Q5, Q1#–Q5# of the two groups are controlled to be turned on and off alternately by control signals output to the control conductor lines 115*a* and 115*b* from control signal terminals 117*a* and 117*b* provided on the drive circuit board 118 as the control means. A circuit for generating the control signal (not shown) may be provided outside of the drive circuit board 118. Alternately such a circuit may be provided on the drive circuit board 118. Each of the control conductor lines 115*a* and 115*b* is a common bus line for each group of the thin film transistors Q1–Q5, Q1#–Q5#. The number of the thin film transistors Q1–Q5, Q1#–Q5# in each group is equal to the number of output signals of the scanning drive LSI. With this arrangement, the wiring space, that is, the space occupied by the conductor lines, is curtailed.

Figure 6:
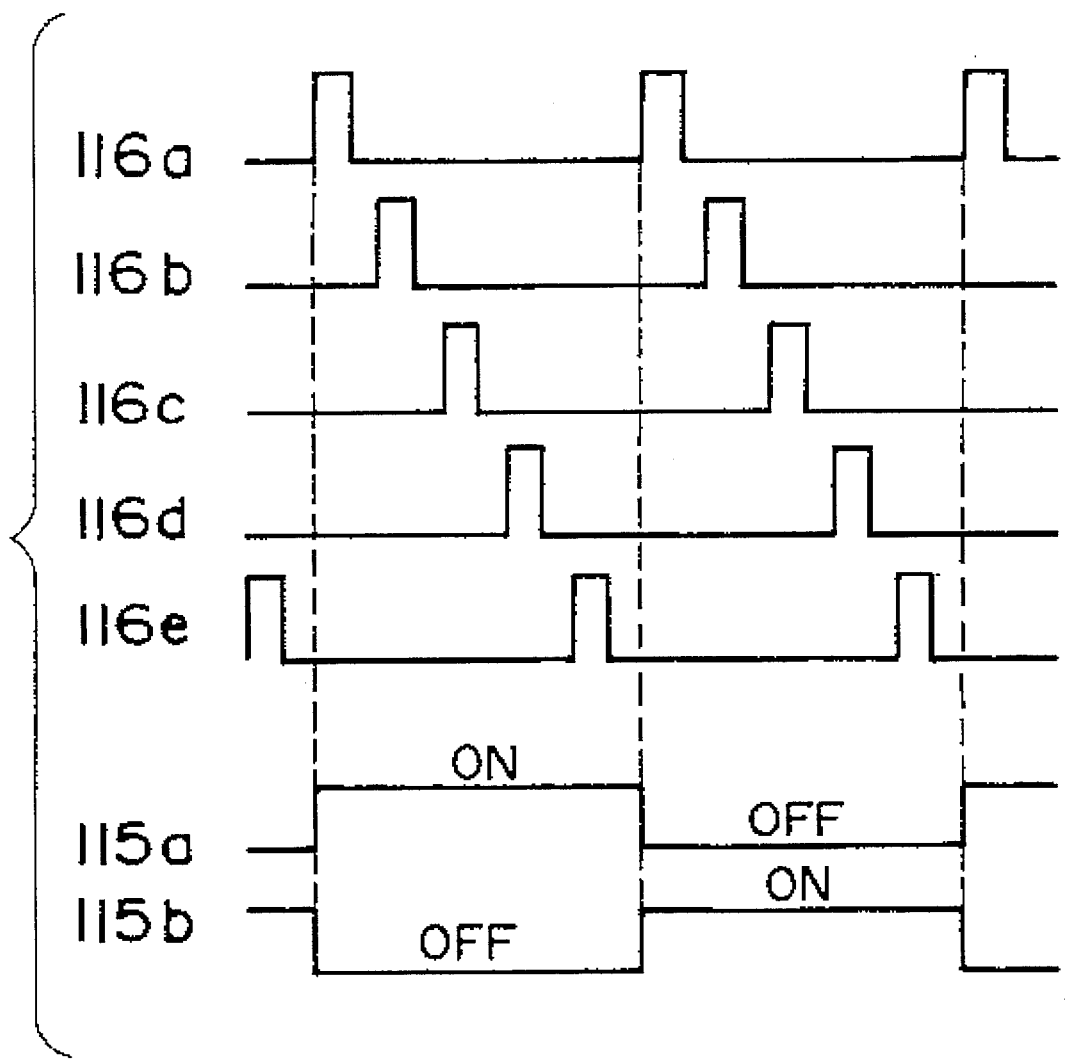
FIG. 6 is a timing chart of control signals of the display device shown in FIG. 5.

In operation, the scanning drive LSI 123 generates pulse output signals in a constant cycle in a manner as shown in FIG. 6 and outputs them from the scanning signal output terminals 116*a*, 116*b*, . . . , 116*e*. Meanwhile, from the control signal output terminals 117*a* and 117*b* are output the control signals which are synchronized with the output signal from the scanning signal output terminal 116*a* and have a cycle two (the number of branches) times greater than the cycle to turn on and off the thin film transistors Q1–Q5 and Q1#–Q5# in each group by turns. At the same time, the output signals (representing image data) at the output terminals 112 of the display drive LSI 122 are applied to the thin film transistors T of the unit cells via the display conductor lines 114. As a result, image display is performed. Thus in the present liquid crystal display device, two scanning conductor lines 108 and 108 can be driven per output signal (output terminal) of the scanning drive LSI. Therefore, the number of scanning drive LSIs to be employed can be reduced to half that of the conventional case, which allows a remarkable cost reduction. Furthermore, it is unnecessary to make finer the pitch of the output terminals 116*a*–116*e* of the scanning drive LSI 123 or to increase the number of the output terminals per drive LSI, and therefore the yield is not reduced.

Figure 9:
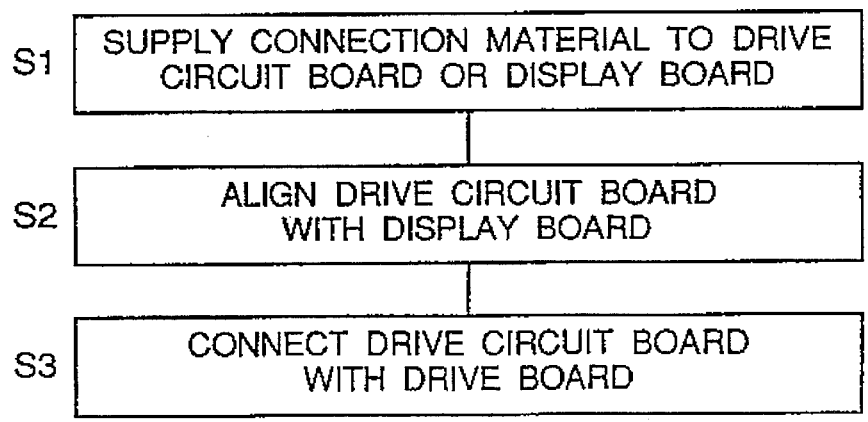
FIG. 9 is a flow chart of the assembly process of the display device of FIG. 5.

Furthermore, the liquid crystal display device can be assembled in a simple and short process as shown in FIG. 9. In more detail, firstly a connection material for connecting the terminals 116*a*–116*e*, 117*a*, 117*b*, 112 of the drive circuit board 118 with the conductor lines 131–135, 115*a*, 115*b*, 114 of the display board (display panel) 107 is supplied to either of the boards 118 and 107 (step S1). Then the boards 118 and 107 are mutually aligned (step S2), and the boards 118 and 107 are connected so that the terminals of the boards 118 and 107 are connected with each other collectively by means of pressure welding or the like (step S3). Thus the assembling can be performed in a very simple and short process as compared with the conventional case, which further reduces the cost.

Although the drive circuit board 118 is provided along the side of the display board 107 perpendicular to the display conductor line 114, and the bent ramification conductor lines 131–135 and the thin film transistors Q1, Q1#; Q2, Q2#; Q3, Q3#; Q4, Q4#; Q5 and Q5# serving as the first switching elements are provided between the scanning conductor lines 108 and the scanning signal output terminals 116*a*–116*e* in the example shown in FIG. 5, the present invention is not limited to the above-mentioned arrangement. For instance, as shown in FIG. 5A, one drive circuit board 118' may be provided along the side of the display board 107 perpendicular to the scanning conductor lines 108 and similar bent ramification conductor lines 131–133 having branches 131*a*–135*a*, 131*b*–135*b* and switching elements Q1–Q3, Q1#–Q3# may be provided between the display conductor lines 114 and the display signal output terminals 112a112c. In FIG. 5A, reference numeral 116 indicates a scanning signal output terminal. In the case of the example of FIG. 5A, the adjacent display conductor lines 114 of the number of the display signal output terminals (three in this case) constitute a group, and the adjacent display conductor lines 114 of each group correspond to the same mth branches (0<m≦ the number of the display signal output terminals) 131a–133a, 131b–133b of the ramification conductor lines. The same mth branches 131a–133a; 131b–133b of the ramification conductor lines constitute a group, and the branches corresponding to the display signal output terminals 112a–112c in each group are disposed in the same order.

Figure 7:
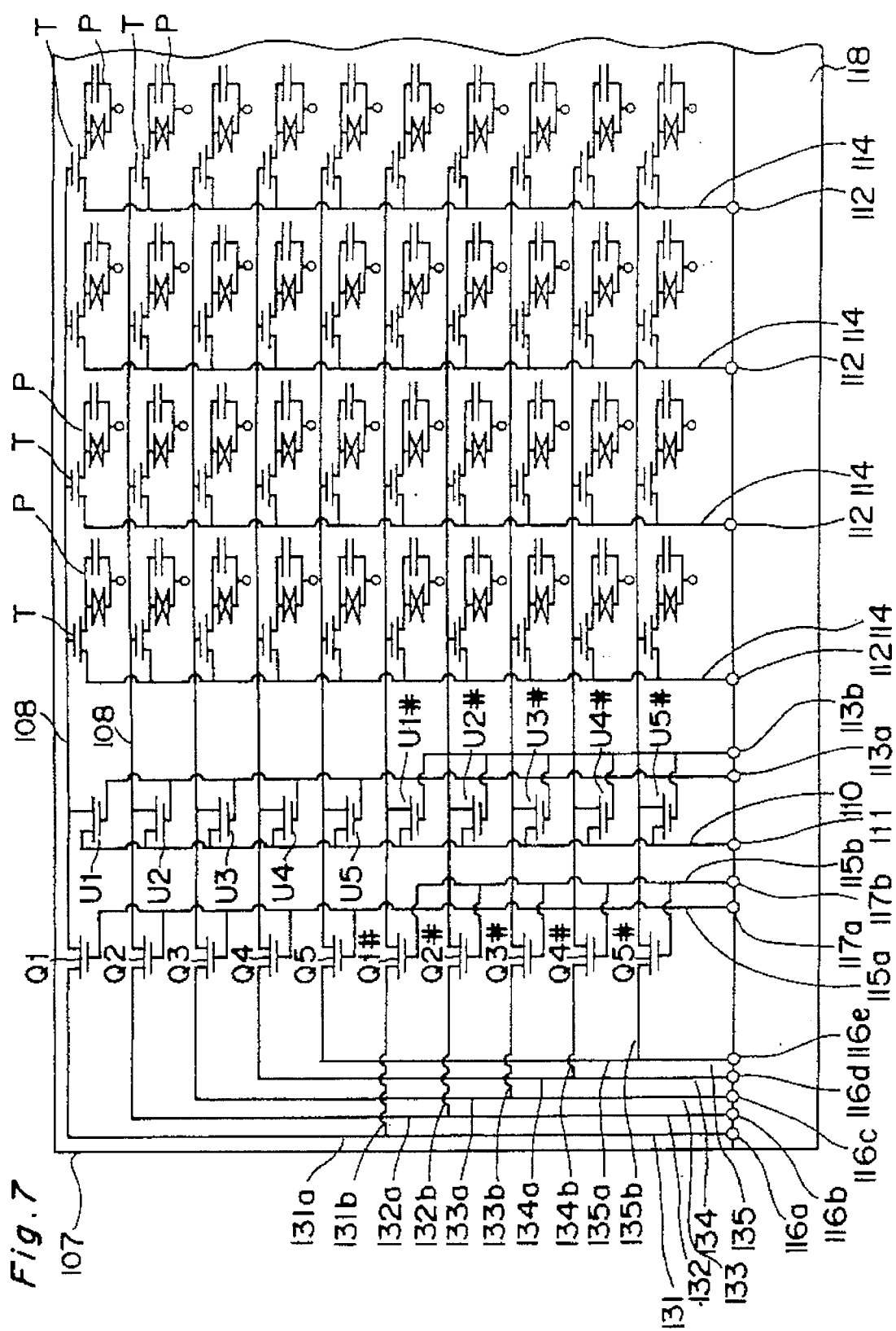
FIG. 7 is a diagram showing a modified example the display device of FIG. 5.
Figure 10:
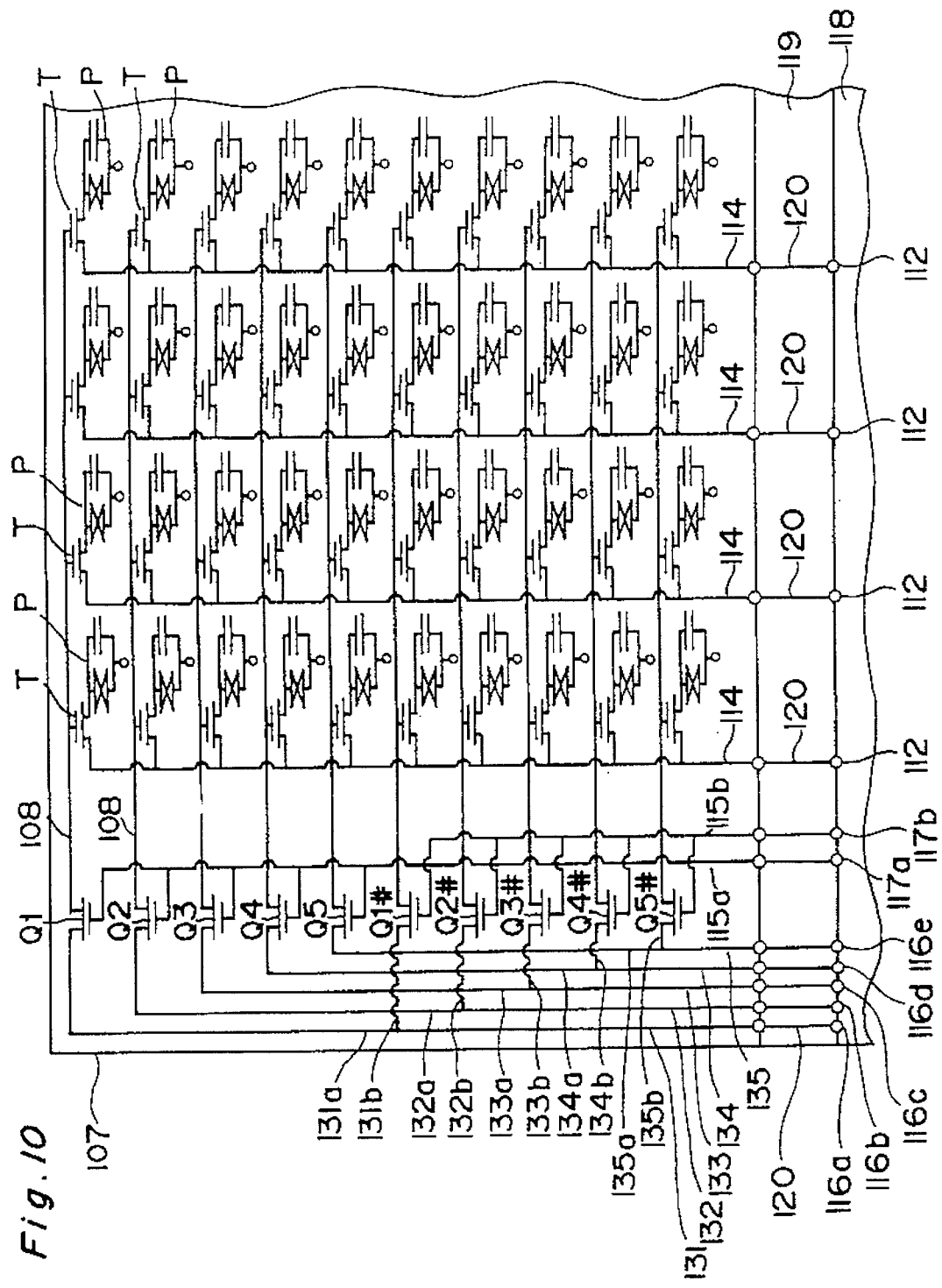
FIG. 10 is a circuit diagram of a display device according to an embodiment of the present invention.

It is to be noted that the scanning drive LSI 122 and the display drive LSI 123 are not shown in FIGS. 5A, 7 and 10 for the sake of simplification of the drawings. Furthermore, although only one scanning drive LSI 122 and only one display drive LSI 123 are shown in FIG. 5, it will be easily understood that more drive LSIs 122, 123 can be provided.

Furthermore, it is possible to provide ramification lines both between the scanning signal output terminals and the scanning conductor lines 108 and between the display signal output terminals and the display conductor lines 114. In this case, either the ramification conductor lines to be connected the scanning conductor lines 108 or the ramification conductor lines to be connected with the display conductor lines 114 extend in the direction of the rows or the columns.

Figure 8:
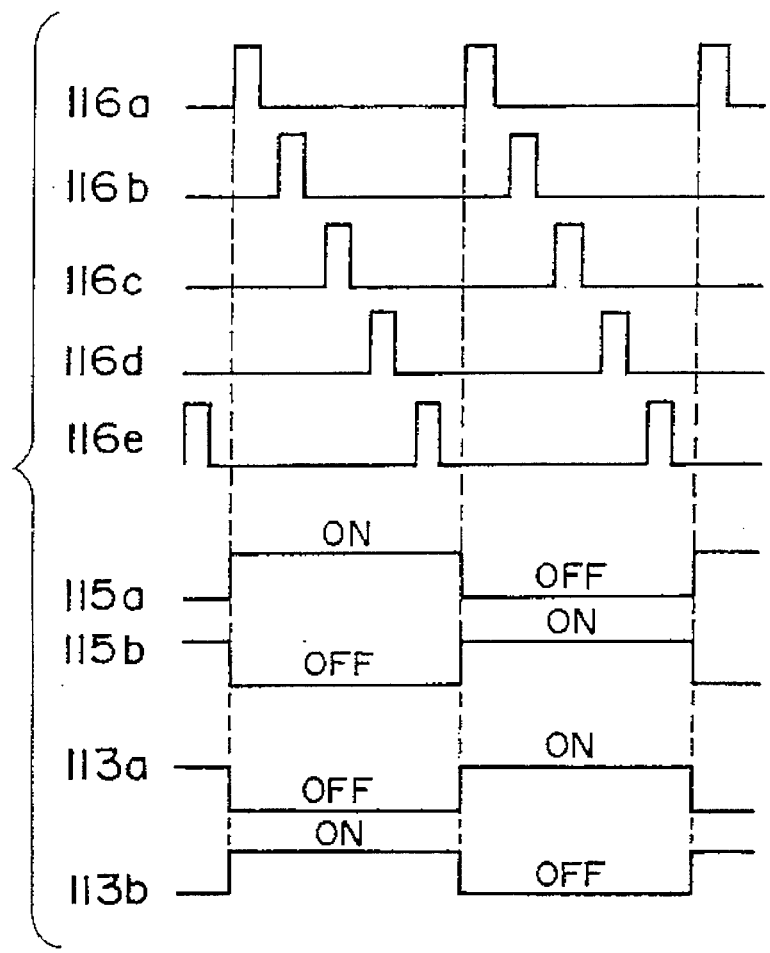
FIG. 8 is a timing chart of control signals of the display device of FIG. 7.

In the example shown in FIG. 5, when the thin film transistors Q1–Q5, Q1#–Q5# are off, the electric potential at the scanning conductor line 108 sometimes becomes unstable to insufficiently turn off the thin film transistor T of each unit cell. In such a case, as shown in FIG. 7, thin film transistors U1, U2, U3, U4, U5, U1#, U2#, U3#, U4#, U5# are provided as second switching elements between the scanning conductor lines 108 and an off voltage supply line 110 connected to an external power terminal 111 having a voltage which sufficiently turns off the thin film transistor T of each unit cell as shown in FIG. 7. Then the electric potentials at control conductor lines 113a and 113b are controlled to turn on each of the above-mentioned thin film transistors U1–U5, U1#–U5# when the thin film transistors Q1–Q5, Q1#–Q5# are each off in correspondence with the electric potentials at the control conductor lines as shown in FIG. 8. With the arrangement of FIG. 7, the electric potentials at the scanning conductor lines 108 are stabilized when the thin film transistors Q1–Q5, Q1#–Q5# are off to allow the thin film transistor T of each unit cell to be sufficiently turned off.

Although the ramification conductor lines 131–135 are each bifurcated in the embodiments described as above, the present invention is not limited to such an arrangement. Unless the yield of connection is problematic, the number of branches can be increased to 3, 4 or more according which the number of scanning drive LSIs (or display drive LSIs) to be employed can be reduced to ⅓, ¼ or less.

Since the first and second switching elements Q1–Q5 Q5, Q1#–Q5#, U1–U5, U1#–U5# are composed of thin film transistors, the transistors can be easily formed in an ordinary liquid crystal display device manufacturing process. Therefore, the transistors can be provided without increasing the cost. When the first and second switching elements are made of thin film rectifying elements, the rectifying elements can be also easily formed in an ordinary liquid crystal display device manufacturing process, and therefore it does not increase the cost.

FIG. 10 shows an example where a flexible wiring board 119 is interposed as a junction board between the display board 107 and the drive circuit board 118. The flexible wiring board 119 has substantially parallel conductor lines 120 to relay the output signals of each drive LSI. In order to reduce the external dimensions of the resulting module, the drive circuit board 118 may be placed on a peripheral portion of the rear surface of the display board 107.

The display device of FIG. 10 is produced as follows. After a connection material is supplied to the parallel conductor lines 120 of the junction board 119, the junction board 119 and the drive circuit board 118 are placed in position on one side of the display board 107. Then the parallel conductor lines 120 of the junction board 119 are collectively connected with both the conductor lines on the display board 107 and the output terminals on the drive circuit board 118 by means of the connection material. As is obvious, the number of steps for assembly is fewer as compared with the conventional case.

Figure 11:
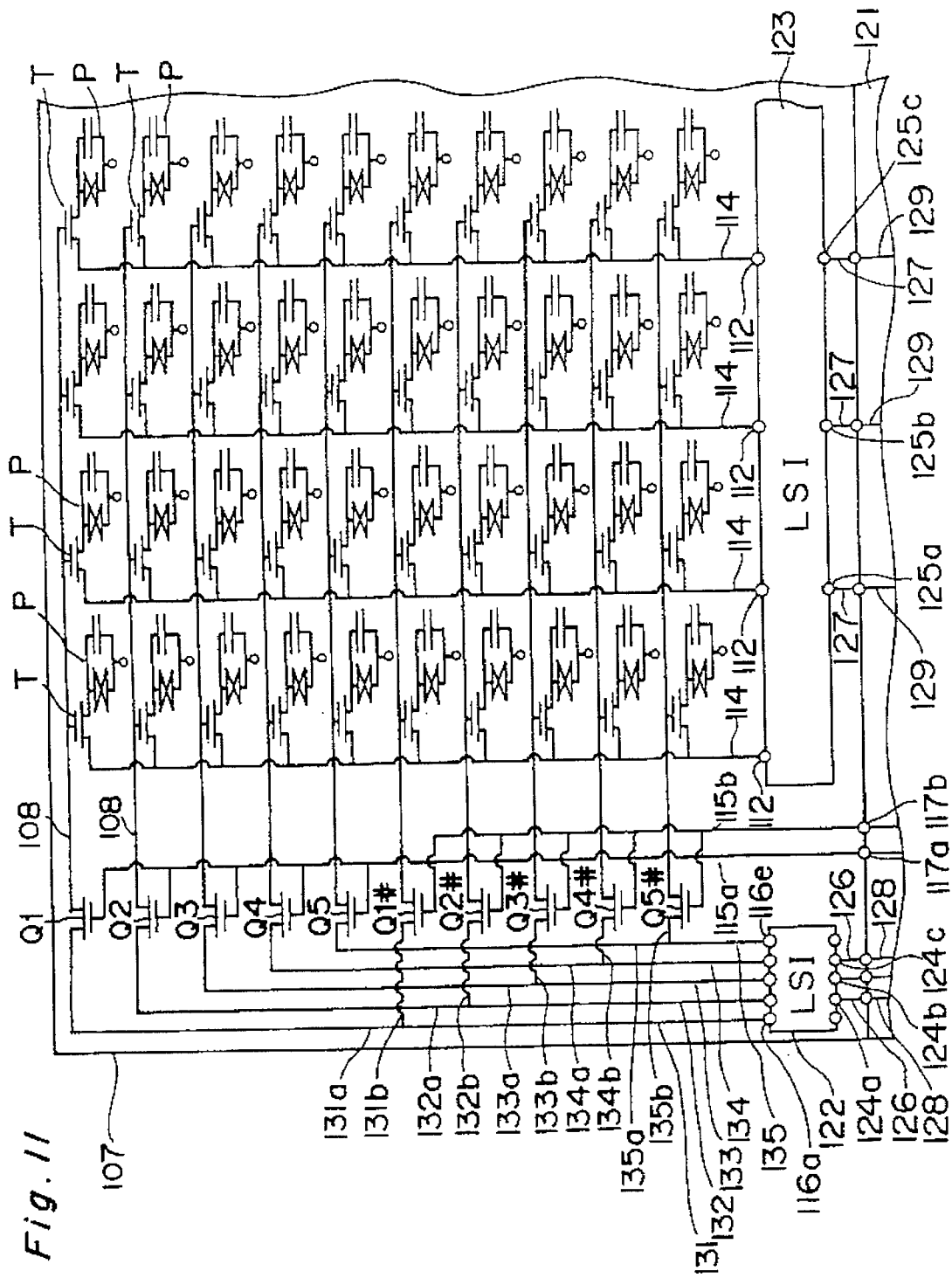
FIG. 11 is a circuit diagram of a liquid crystal display device according to an embodiment of the present invention.

Furthermore, the scanning drive LSI 122 and the display drive LSI 123 are not always required to form an external circuit of the display device. As shown in Fig. 11, the scanning drive LSI 122 and the display drive LSI 123 may be provided on the display board 107, and powers and signals may be supplied to input terminals 124a, 124b, 124c, 125a, 125b, 125c of the drive LSIs 122 and 123 from a control board 121 having conductor lines 128, 129 for supplying powers and signals. In this case, the entire display device can be made compact.

The display device as shown in FIG. 11 can be assembled in the following way. First, the display board 107 mounted with the drive circuits 122 and 123 and the control board 121 having the conductor lines 128, 129 are prepared. A connection material for connecting the input terminals 124a–124c, 125a–125c of each of the drive LSIs 122, 123 with the conductor lines 128, 129 is supplied to either the display board 107 or the control board 121. Then the control board 121 is placed adjacently along a side of the display board 107, and the conductor lines 128, 129 on the control board 121 are collectively connected directly with the input terminals 124a–124c, 125a–125c of each of the drive LSIs 122, 123 or through the conductor lines 126, 127 on the display board connected to the input terminals 124a–124c, 125a–125c by means of the connection material.

When the junction board 119 having the parallel conductor lines 120 is interposed between the display board 107 and the control board 121, although such an example is not shown, the connection material is supplied to the parallel conductor lines 120 of the junction board 119. Then, after placing the junction board 119 and the control board 121 in position on one side of the display board 107, the conductor lines 128, 129 on the control board 121 and either the input terminals 124a–124c, 125a–125c of each of the drive LSIs 122, 123 or the conductor lines 126, 127 are collectively connected with the parallel lines 120 on the junction board 119 by the connection material.

As is evident from the above description, according to the display device of the present invention, each output signal (output terminal) of either the scanning drive LSI or the display drive LSI is transmitted to a plurality of scanning conductor lines or display conductor lines by way of the corresponding ramification conductor line and first switching element. Therefore, the scanning conductor lines (or the display conductor lines) of the number corresponding to the number of the branches of one ramification conductor line are driven per output terminal of the scanning drive LSI or the display drive LSI. Therefore, the number of the scanning drive LSIs (or the display drive LSIs) to be employed becomes the reciprocal of the number of the branches and is much smaller as compared with the conventional case to allow a remarkable cost reduction to be achieved. Furthermore, since the above arrangement neither makes finer the pitch of the output terminals of the drive LSI nor increases the number of output terminals per drive LSI, the yield is not reduced. Rather the yield increases because the connection portions of the drive LSIs are reduced in number as a whole. Furthermore, because the display signal output terminals and the scanning signal output terminals are arranged along a side of the display board, the display drive LSI and the scanning drive LSI can be mounted on a common drive circuit board along the side of the display board. When this arrangement is adopted, only one process is required for connecting the display board with the drive circuit board.

Figure 12:
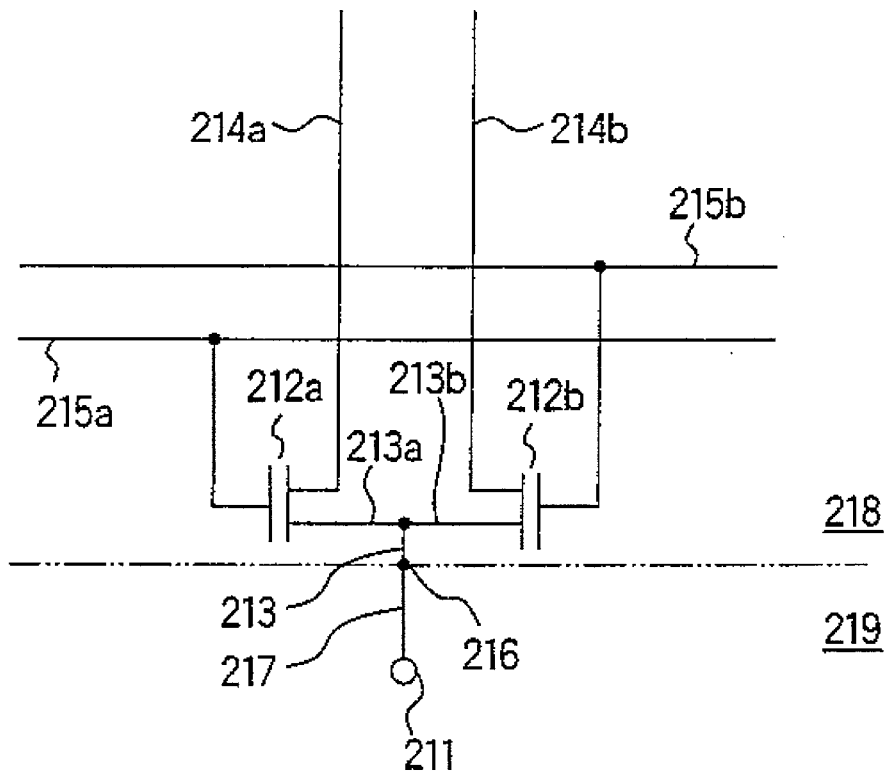
FIG. 12 is a schematic circuit diagram illustrating a connection structure between a display panel and a drive LSI for a display device according to the present invention.

FIG. 12 shows a schematic circuit diagram of a connection section between a display panel and a drive LSI of the display device in accordance with another embodiment of the present invention. According to the assembly structure of the display device of the present embodiment, a conductor line for sending one signal output from a drive LSI is bifurcated, and a switching element is provided for each branch.

Referring to FIG. 12, an output conductor line 217 connected to an output terminal 211 of the drive LSI formed on a flexible board 219 is connected via a connection portion 216 to a display panel board 218 to a ramification conductor line 213 formed on the display panel board 218 and ramified into two branches 213a and 213b at one end thereof.

Between the branches 213a and 213b and signal transmission conductor lines 214a and 214b connected to the branches 213a and 213b are formed thin film transistors (each referred to as the "TFT" hereinafter) 212a and 212b which serve as the switching elements. Control conductor lines 215a and 215b for supplying individually to the gates of the TFTs 212a and 212b TFT control signals for controlling turning-on and turning-off of the TFTs are provided perpendicular to the signal transmission conductor lines 214a and 214b.

With the above-mentioned arrangement, by supplying the TFT control signals alternately to the control conductor line 215a and the control conductor line 215b, the TFT 212a and the TFT 212b are alternately turned on and off to allow a signal from one output terminal 211 of the drive LSI to be transmitted alternately to the two signal transmission conductor lines 214a and 214b.

Figure 13:
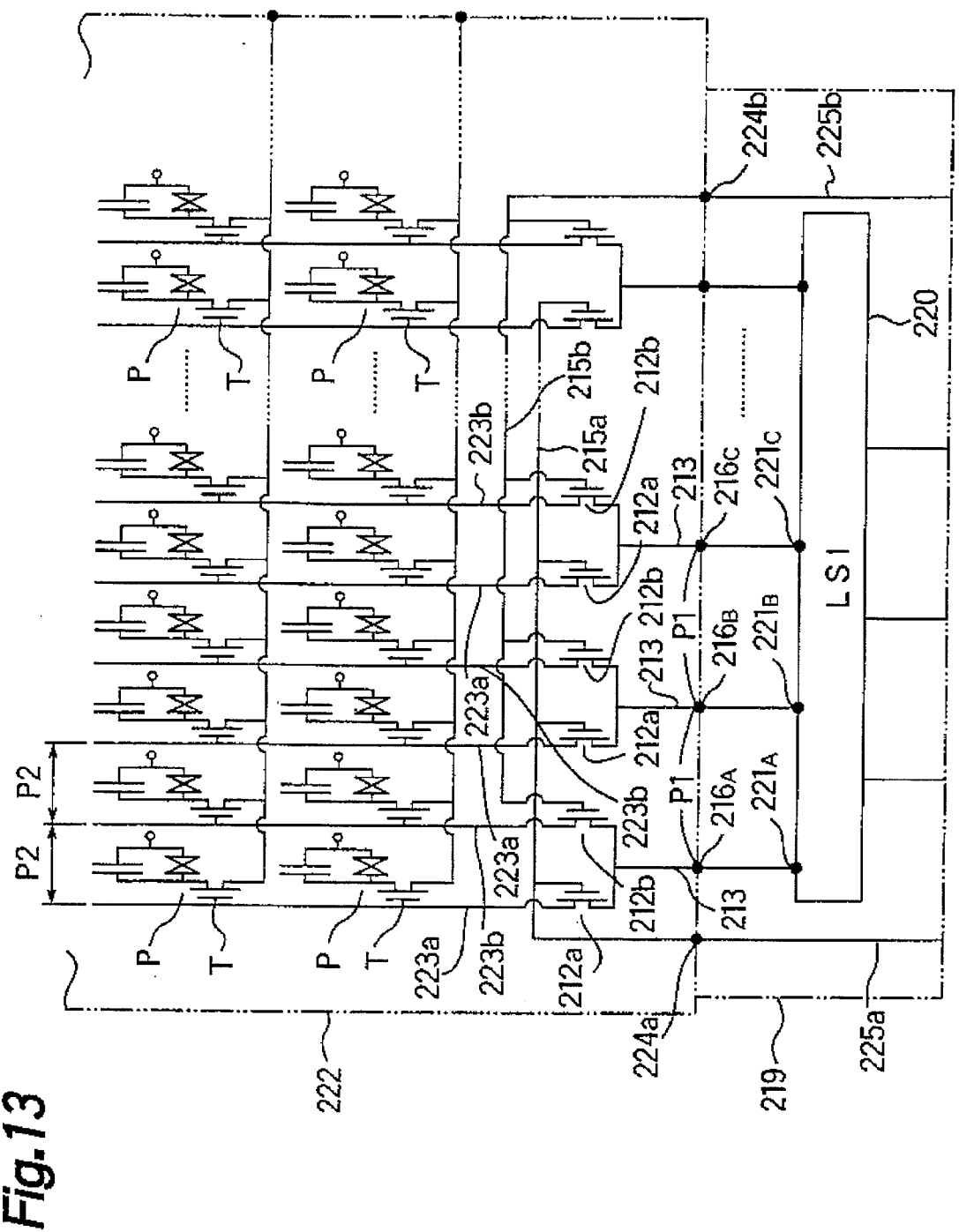
FIG. 13 is a circuit diagram of a TFT liquid crystal display device to which the connection structure of FIG. 12 is applied.

FIG. 13 shows a schematic circuit diagram of a connection section between a TFT liquid crystal display panel and a drive LSI in the case where the assembly structure of the display device as shown in FIG. 12 is applied to a TFT liquid crystal display device. It should be noted that like components are denoted by the same reference numerals in FIGS. 12 and 13.

Output terminals 221A, 221B, 221C, . . . of a drive LSI 220 formed on flexible board 219 are connected to connection portions 216A, 216B, 216C, . . . for electrically connecting a liquid crystal display panel board 222 with the flexible board 219 by way of output conductor lines.

The ramification conductor lines 213 connected to the connection portions 216A, 216B, 216C, . . . on the side of the liquid crystal display panel board 222 are each ramified into two branches in the same manner as in FIG. 12. Between the branches and the scanning signal transmission conductor lines 223a and 223b are formed TFTs 212a and 212b which serve as switching elements. The control conductor lines 215a and 215b for supplying a TFT control signal individually to the gate electrodes of the TFTs 212a and 212b are provided perpendicularly to the scanning signal transmission conductor lines 223a and 223b. Ends of the control conductor line 215a and 215b are connected to control conductor lines 225a and 225b on the flexible board 219 via the connection portions 224a and 224b respectively.

As is evident from FIG. 13, the pitch P1 of the connection portions 216A, 216B, 216C . . . for connection between the liquid crystal display panel board 222 and the flexible board 219 is about twice as great as the pitch P2 of the scanning signal transmission conductor lines 223a, 23b, 223a, 223b, . . . on the liquid crystal display panel board 222.

Figure 14:
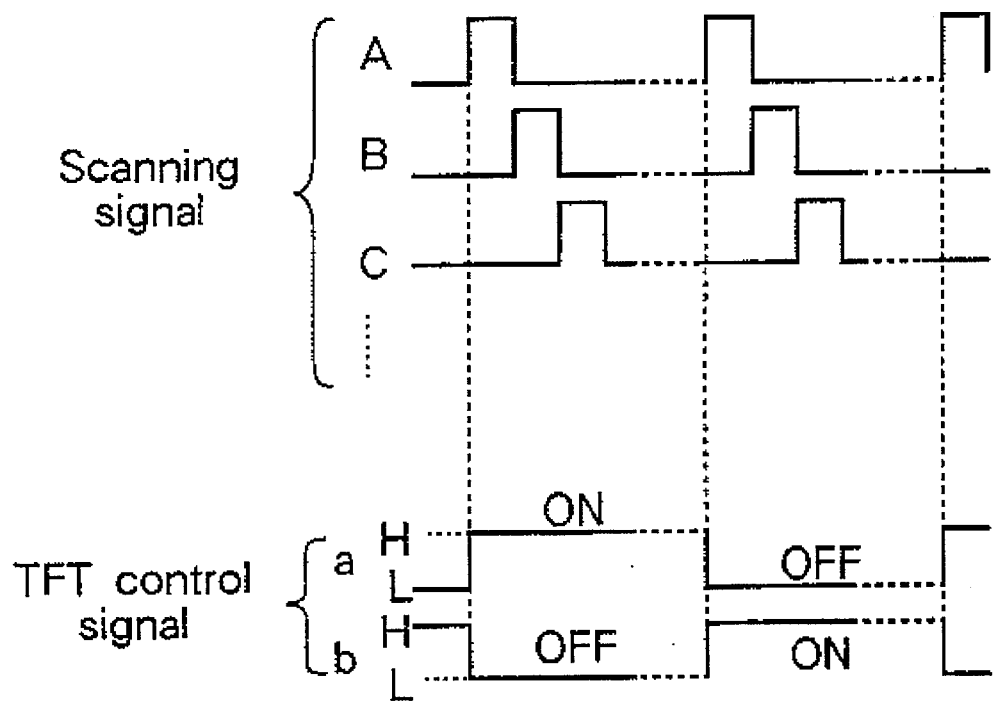
FIG. 14 is a timing chart of TFT control signals for alternately turning on and off the TFTS shown in FIG. 13.

FIG. 14 shows examples of waveforms of the TFT control signals for alternately turning on and off the TFTs 12a and 212b of the TFT liquid crystal display device shown in FIG. 13. A TFT control signal a is supplied to the control conductor line 225a shown in FIG. 13 to turn on the TFT 212a when the control signal has a high logic level "H" to allow a scanning signal to be transmitted to the scanning signal transmission conductor line 223a. Meanwhile, a TFT control signal b is supplied to the control conductor line 225b to turn on the TFT 212b when the control signal has a high logic level "H" to allow a scanning signal to be transmitted to the scanning signal transmission conductor line 223b.

Therefore, by inverting the levels of the TFT control signals a and b in correspondence with the cycles of scanning signals A, B, C, . . . as shown in FIG. 14 output from the output terminals 221A, 221B, 221C, . . . of the aforementioned drive LSI 220, the scanning signal transmission conductor lines 223a, 223a, . . . are scanned in the first scanning time in response to the scanning signals A, B, C, . . . output from output terminals 221A, 221B, 221C, of the drive LSI 220, and the scanning signal transmission conductor lines 223b, 223b, . . . are scanned in the second scanning time.

In other words, twice as many scanning signal transmission conductor lines as the number of scanning signals output from the drive LSI 220 can be scanned. Therefore, by increasing the number of branches of the ramification conductor line 213 connected to the scanning signal output terminal of the drive LSI 220 to three, four, or more, it is possible to scan three, four, or more times as many scanning signal transmission conductor lines as the scanning signal transmission conductor lines used in the conventional case.

Figure 15:
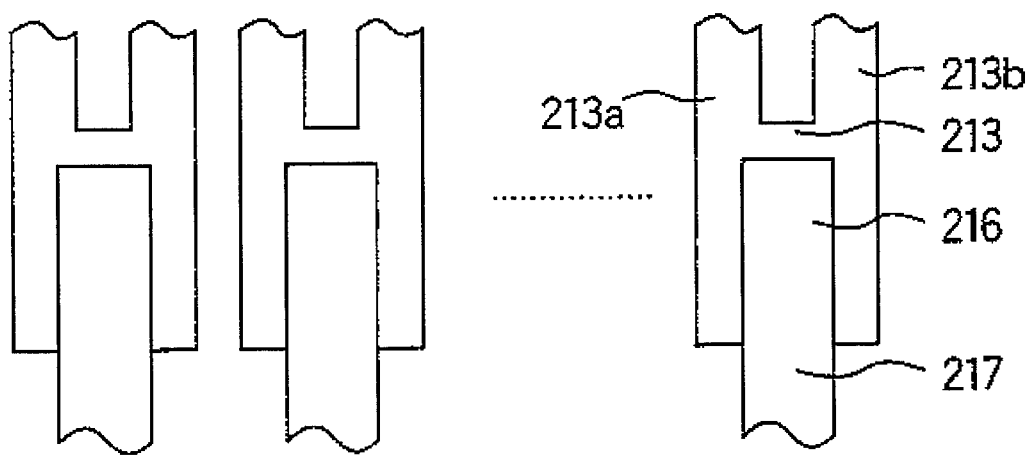
FIG. 15 is a diagram showing a pattern of the connection portion shown in FIG. 13.

FIG. 15 shows an example of a pattern around the connection portion between the liquid crystal display panel board 222 and the flexible board 219 shown in FIG. 13. Referring to FIG. 15, a connection terminal (a first connection terminal) of the output conductor line 217 and a connection terminal (a second connection terminal) of the ramification conductor line 213 on the side of the liquid crystal display panel board 222 are mutually aligned and connected with each other by direct pressure welding using an anisotropic conductive film, solder, photo-setting resin, clip, or the like or another method to form the aforementioned connection portion 216. In the following description, the "connection portion" is defined as a portion where two corresponding connection terminals are connected with each other.

The ramification conductor lines 213 are each ramified into two branches 213a and 213b on the side of the scanning signal transmission conductor lines 223.

According to the assembly structure of the display device of the present embodiment shown in FIGS. 12–15, the output conductor line 217 connected to the output terminal 221 of the drive LSI 220 on the flexible board 219 is connected to the ramification conductor line 213 on the liquid crystal display panel board 222 via the connection portion 216. Between the branches 213a and 213b of the ramification conductor line 213 and the scanning signal transmission conductor lines 223a and 223b are formed the TFTs 212a and 212b. The TFT 212a and the TFT 212b are alternately turned on and off by the TFT control signals alternately supplied to the gate electrodes of the TFTs from the control conductor line 215a or the control conductor line 215b. Therefore, a scanning signal from one output terminal 221 of the drive LSI 220 can be transmitted alternately to the two scanning signal transmission conductor lines 223a and 223b on the liquid crystal display panel board 222.

In other words, the present embodiment can achieve a display device assembly structure which on one hand can significantly reduce the number of drive LSIs required to be used for driving the liquid crystal display panel, when compared with the conventional assembly structure and which on the other hand can make finer the liquid crystal display panel (which means an increase of the number of pixels P=reduction of the pixel pitch) without reducing the pitch of the output terminals of the drive LSIs or increasing the number of the drive LSIs. According to the present display device assembly structure, the conventional flexible board with the LSIs and the conventional connection methods can be used. Also, the conventional connection material such as the anisotropic conductive film and the conventional equipment for connection can be used. Thus, neither investment for development of new methods and materials nor investment for new equipments is required. As a result, a superior display device assembly structure is achieved at a low cost.

Furthermore, according to the present embodiment, the liquid crystal display panel board 222 and the flexible board 219 are required to be connected with each other at twice as large a pitch as the pitch of the scanning signal transmission conductor lines 223 formed on the liquid crystal display panel board 222. Therefore, the pitch of the connection portions 216 can be set wide enough to remarkably improve the reliability of the connection between the liquid crystal display panel board 222 and the flexible board 219.

Figure 16:
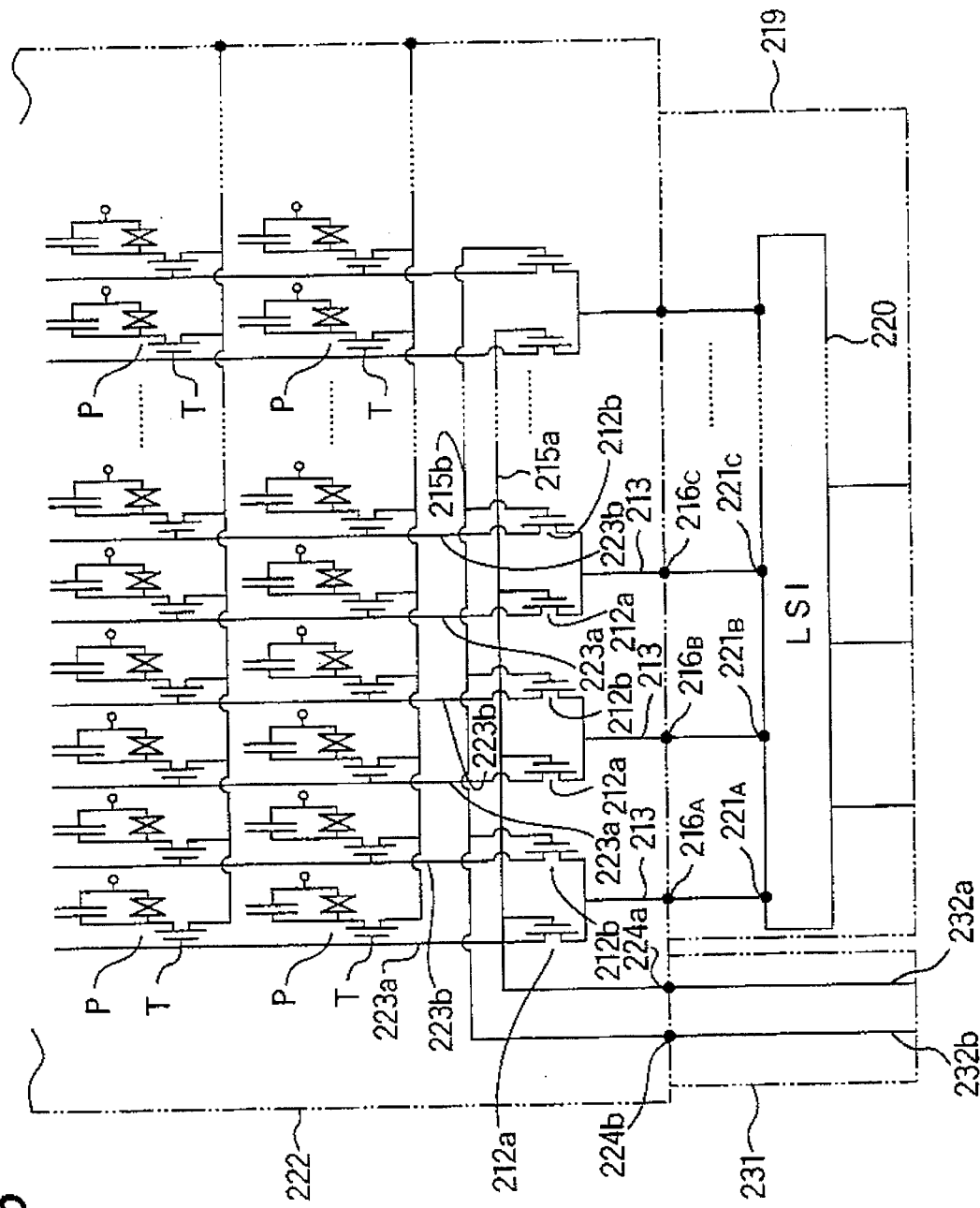
FIG. 16 is a circuit diagram of another TFT liquid crystal display device to which the connection structure of FIG. 12 is applied.

FIG. 16 shows a circuit diagram of a variant of the TFT liquid crystal display device shown in FIG. 13 to which the assembly structure of the display device as shown in FIG. 12 is applied. It should be noted that like components are denoted by the same reference numerals in FIGS. 13 and 16, and no further description therefor is provided below.

In the embodiment of FIG. 13, the flexible board 219 has control conductor lines 225a and 225b whose connection terminals (third connection terminals) are connected via the connection portions 224a and 224b to connection terminals (fourth connection terminals) of the control conductor lines 215a and 215b respectively for supplying a TFT control signal individually to the gate electrodes of the TFTs 212a and 212b. In the embodiment of FIG. 16, control conductor lines, denoted now by 232a and 232b, are formed on a circuit board 231 provided separately from the flexible board 219.

Thus by supplying the TFT control signal to the control conductor lines 215a and 215b from the circuit board 231 different from the flexible board 219, a commercially available flexible board on which a drive LSI is mounted can be utilized as it is.

Figure 17:
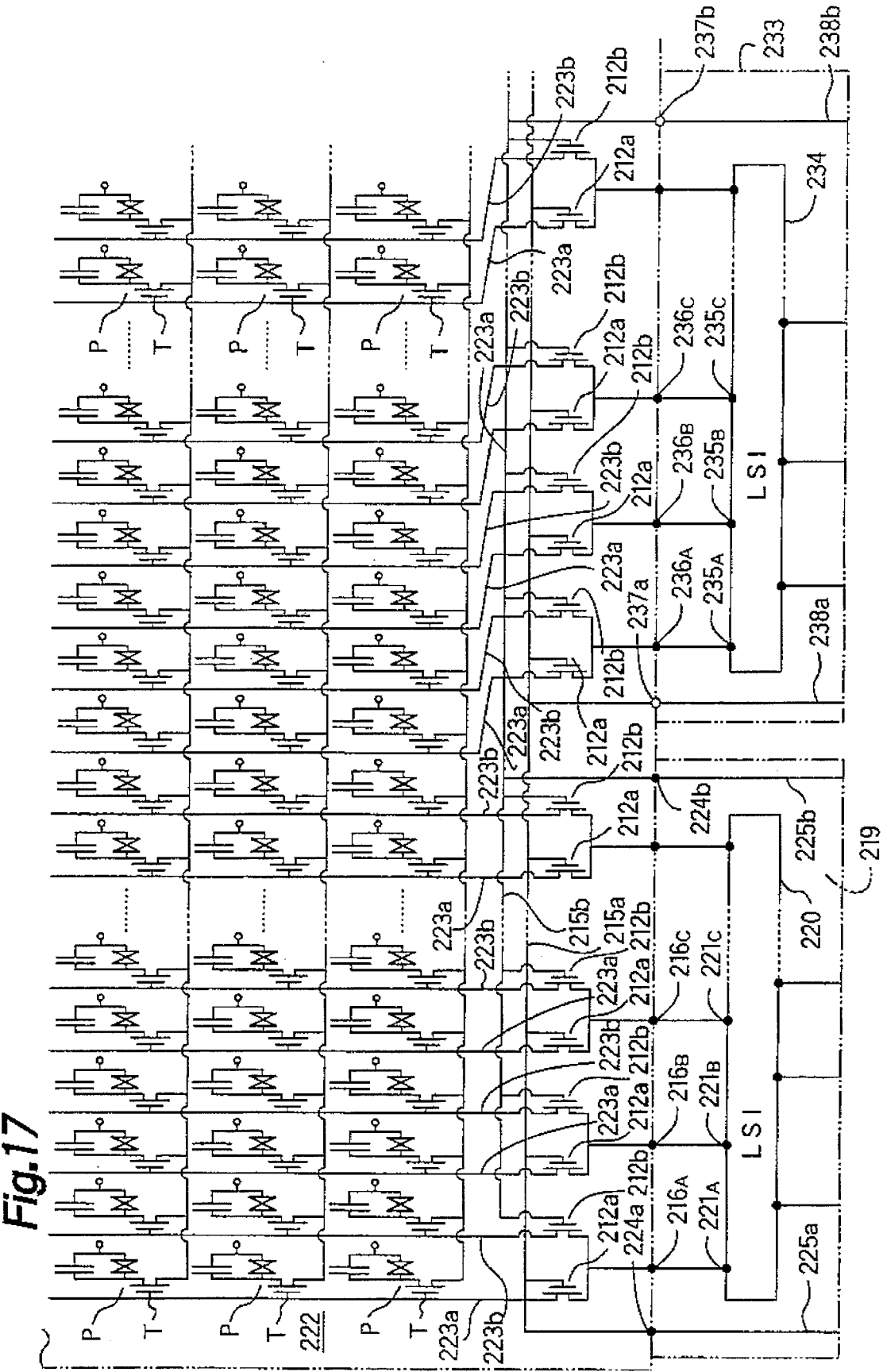
FIG. 17 is a circuit diagram of another TFT liquid crystal display device to which the connection structure of FIG. 12 is applied.

FIG. 17 shows a circuit diagram of another embodiment where the assembly structure of the display device as shown in FIG. 12 is applied to a TFT liquid crystal display device. It should be noted that like components are denoted by the same reference numerals in FIGS. 13, 16 and 17 and no description therefor is provided below.

In the present embodiment, the TFT liquid crystal display panel is driven by the scanning signals from a plurality of drive LSIs (only two 220, 234 of which are shown). The drive LSIs 220, 234 are formed on respective exclusive-use flexible boards 219, 233 having the same configuration.

The control conductor lines 215a and 215b for supplying the TFT control signals individually to the gate electrodes of the TFTs 212a and 212b are connected to the control conductor lines 225a and 225b formed on the flexible board 219 via the connection portions 224a and 224b in the same manner as in FIG. 13. When the other flexible boards have such control conductor lines 238a, 238b, . . . , the control conductor lines 215a and 215b are not connected to the control conductor lines 238a, 238b by providing unconnected portions 237a and 237b.

With this arrangement, only one type of flexible board is required to be newly designed.

Figure 18:
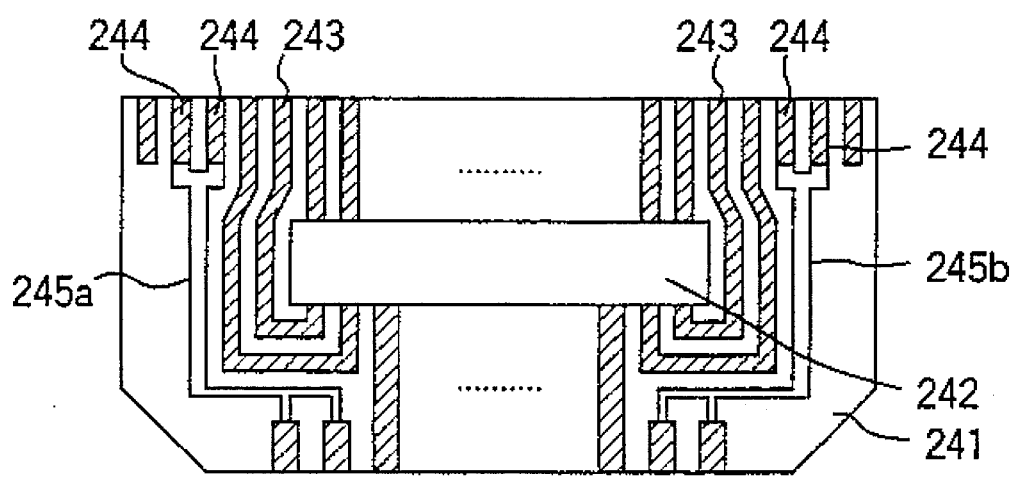
FIG. 18 is an exemplified wiring pattern of a flexible bold of the examples shown in FIGS. 13 and 17.

FIG. 18 shows an example of a wiring pattern of the flexible board 219 provided with the control conductor lines to be connected to the control conductor lines 215a and 215b on the liquid crystal display panel board 222 via the connection sections 224a and 224b. In general, a flexible board 241 being on the market or already existing is formed with a drive LSI 242, and a plurality of auxiliary terminal patterns (or dummy terminal patterns) 244, 244, . . . are provided for the output signal conductor line patterns 243, 243, . . . from the drive LSI 242.

Therefore, control conductor line patterns 245a and 245b (corresponding to the control conductor lines 225a and 225b shown in FIGS. 13 and 17) for supplying the TFT control signals to the gate electrodes of the TFTs 212a and 212b are formed on the flexible board 241 by utilizing the auxiliary terminal patterns (or the dummy terminal patterns) 244.

In this case, change of design of the existing or commercially available flexible board and change of design rule of the connection terminals on the side of the liquid crystal display panel board 222 are minimized. Accordingly, the assembly structure of the display device of the invention can be achieved by utilizing the conventional connection material and the conventional connection equipment as they are.

Figure 19:
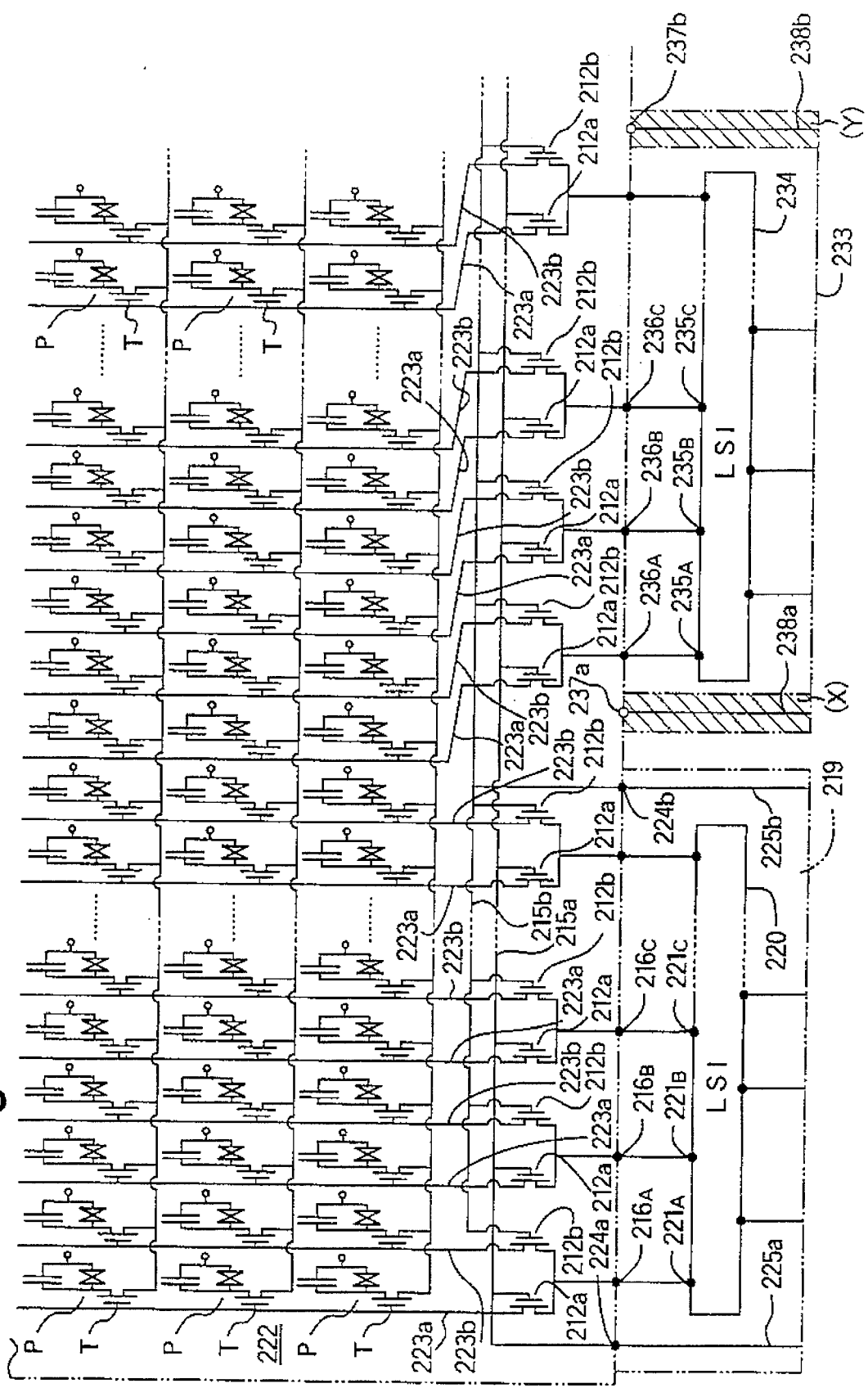
FIG. 19 is a circuit diagram of another TFT liquid crystal display device to which the connection structure of FIG. 12 is applied.

FIG. 19 is a circuit diagram of the vicinity of a connection section between a TFT liquid crystal display panel and a scanning electrode drive LSI in accordance with a modification of the example shown in FIG. 17. It should be noted that in FIGS. 17 and 19 like components are denoted by the same reference numerals and no description therefor is provided below.

In the present embodiment, the control conductor lines 215a and 215b for supplying the TFT control signals individually to the gate electrodes of the TFTs 212a and 212b are connected to the control conductor lines 225a and 225b formed on the flexible board 219 via the connection portions 224a and 224b in the same manner as in FIG. 17. The control conductor lines 238a and 238b on the other flexible boards (only one 233 of which is shown) are not used. Therefore unnecessary areas (X) and (Y) on which the control conductor lines 238a and 238b are formed are removed from the other flexible boards 233.

By forming the control conductor lines 225a and 225b only on one flexible board 219 and removing the unnecessary areas (X) and (Y) from the flexible boards 233 as described above, the flexible boards become light in weight and each module can be designed to be compact.

The removal of the areas (X) and (Y) from the flexible boards 233, . . . can be performed when a continuous flexible board having a plurality of sets of the conductor lines of the same pattern is, after getting mounted with a plurality of the drive LSIs in position, subjected to a blanking process for dividing the continuous flexible board into a plurality of individual flexible boards. A conventional flexible board manufacturing procedure is arranged to include a first blanking (or cutting) process in which the areas (X) and (Y) are reserved and a second blanking (or cutting) process in which the areas (X) and (Y) are removed from an individual flexible board. The continuous flexible board is subjected to either the first blanking (or cutting) process or the second blanking (or cutting) process for each purpose. Thus, this method can utilize a conventional flexible board manufacturing procedure.

Figure 20:
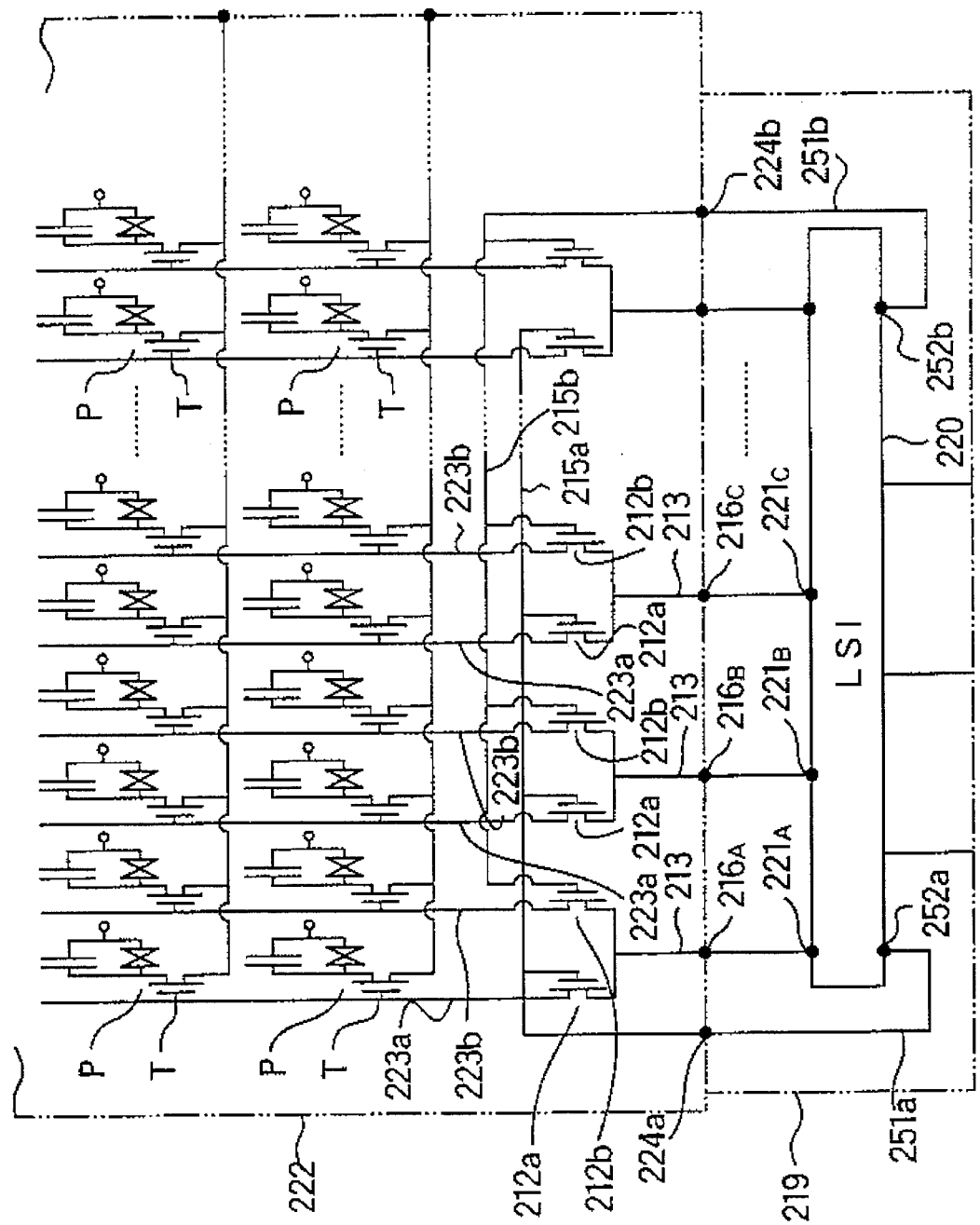
FIG. 20 is a circuit diagram of another TFT liquid crystal display device to which the connection structure of FIG. 12 is applied.

FIG. 20 is a circuit diagram of a connection section between the TFT liquid crystal display panel and the scanning electrode drive LSI in an embodiment where the TFT control signals supplied to the TFTs 212a and 212b is generated by a TFT control signal generating circuit formed inside the drive LSI. It should be noted that in FIGS. 13 and 20 like components are denoted by the same reference numerals and no description therefor is provided here.

The control conductor lines 215a and 215b for supplying the TFT control signals to the gate electrodes of the TFTs 212a and 212b are connected to the control conductor lines 251a and 251b formed on the flexible board 219 via the connection portions 224a and 224b. The respective other ends of the control conductor lines 251a and 251b are connected to output terminals 252a and 252b of the TFT control signal generating circuit (not shown) formed inside the drive LSI 220.

Because the TFT control signal generating circuit is provided inside the drive LSI 220, less design change is required for a control board externally provided, and yet it is possible to achieve the same effect as produced by the assembly structure of the TFT liquid crystal display device.

Figure 21:
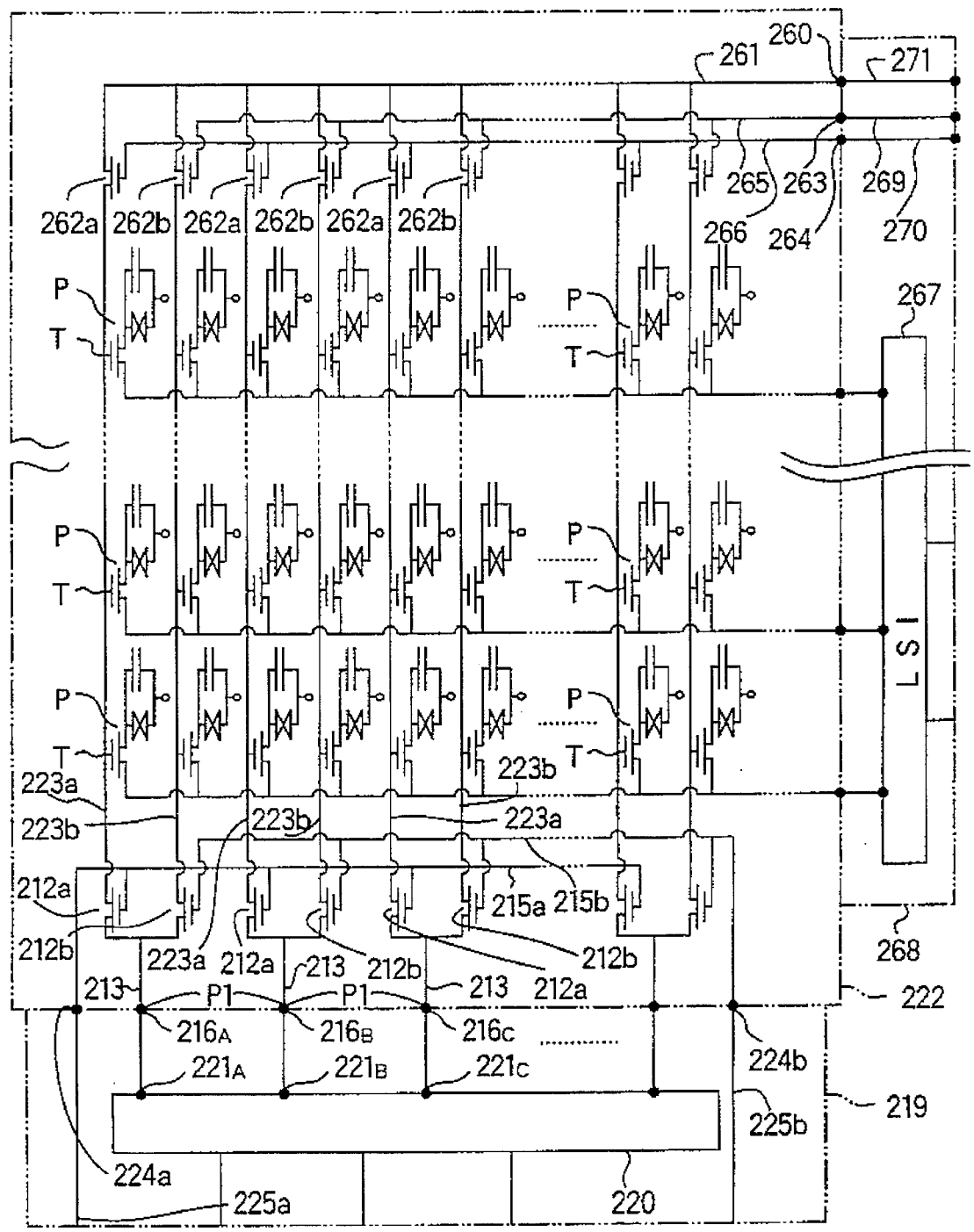
FIG. 21 is a diagram showing a modified example of the connection structure between the TFT liquid crystal display panel and the scanning electrode drive LSI shown in FIG. 13.

FIG. 21 shows a modification of the embodiment shown in FIG. 13.

In the example shown in FIG. 13, when either the TFT 212a or the TFT 212b is selected, an electric potential at the scanning signal transmission conductor line (e.g., scanning signal transmission conductor line 223a) connected to the TFT being not selected (e.g., TFT 212a) may become unstable, which may cause the pixels connected to the scanning signal transmission conductor line (e.g., scanning signal transmission conductor line 223a) to exhibit a faulty display image.

In order to avoid such a thing, in the present embodiment as shown in FIG. 21, a stabilizing power is supplied to the scanning signal transmission conductor lines 223a and 223b from a connection portion 260 via a power line 261 and TFTs 262a and 262b. In this case, the TFTs 262b are controlled to be turned on and off by the TFT control signal supplied to the TFTs 262b from the connection portion 263 via a control conductor line 265, while the TFTs 262a are controlled to be turned on and off by the TFT control signal supplied to the TFT 262a from a connection section 264 via a control conductor line 266, whereby the stabilizing power is supplied to the unselected scanning signal transmission conductor line 223a or scanning signal transmission conductor line 223b.

The above-mentioned TFTs 262a and 262b may be provided adjacent to the TFTs 212a and 212b. However, in the present embodiment, the TFTs 262a and 262b are provided at the side opposite from the side where the TFTs 212a and 212b are provided. By so doing, the time during which the TFT T connected to the pixel P is supplied with the scanning signal can be as short as possible, whereby the scanning signal can be stably supplied thereto.

In the present case, conductor lines 269 and 270 for externally supplying the TFT control signals to the above-mentioned control conductor lines 265 and 266 as well as a conductor line 271 for externally supplying the stabilizing power to the power line 261 are provided on a flexible board 268 on which a drive LSI 267 exists for supplying a display signal to each TFT constituting each pixel on the liquid crystal display panel board 222.

Thus, in connecting the flexible board 268 and the liquid crystal display panel board 222, the conductor lines 269, 270, and 271 can be collectively connected with the control conductor lines 265 and 266 and the power line 261 by way of the connection portions 263, 264, and 260. Furthermore, there is no need to prepare any additional flexible board for the conductor lines 269, 270, and 271, which allows for a reduction in the number of parts.

Figure 22:
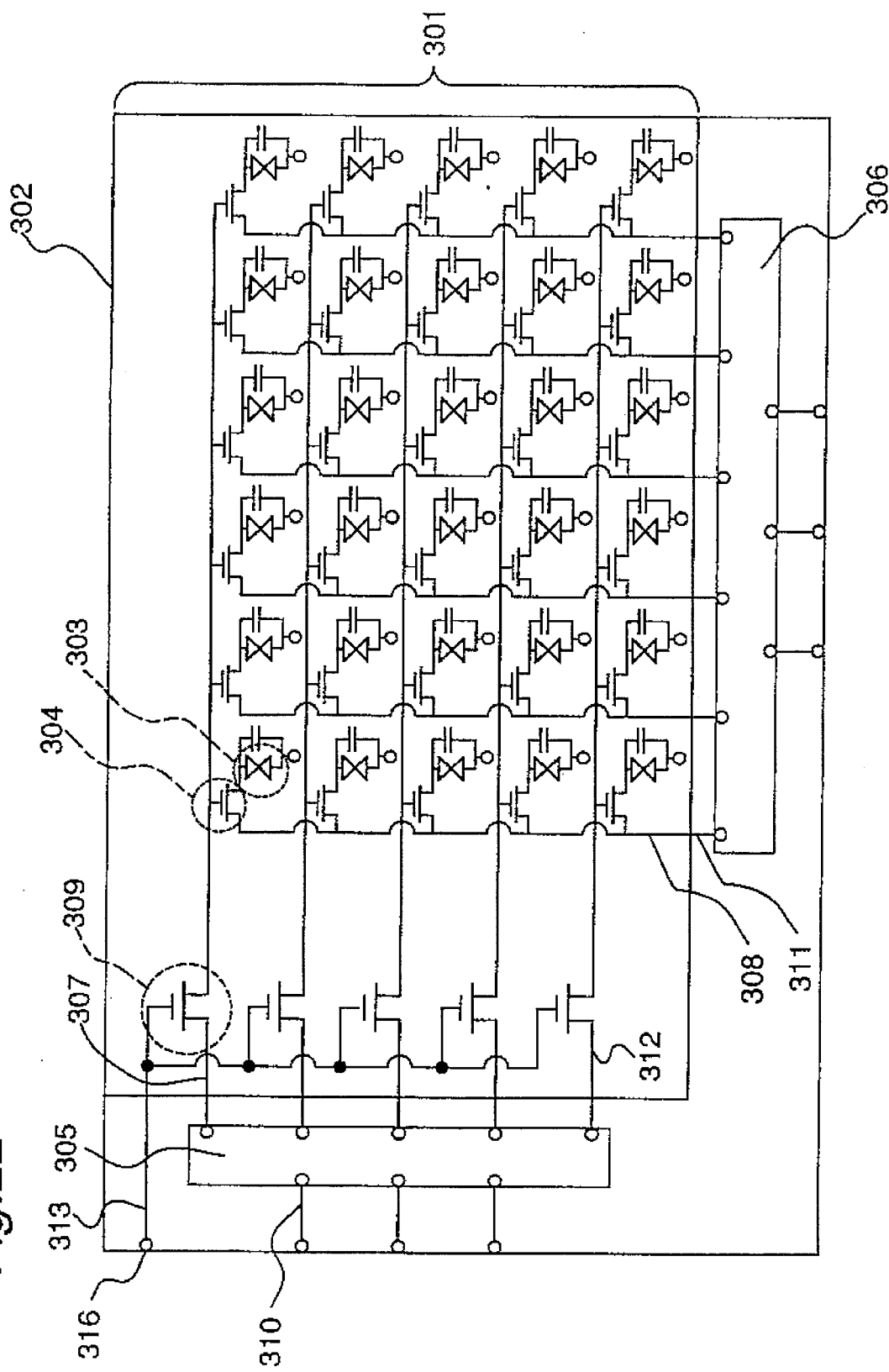
FIG. 22 is a circuit diagram of an active-matrix display device in accordance with an embodiment of the present invention.

FIG. 22 shows an active-matrix display device in accordance with a still further embodiment of the present invention. On a transparent insulating board 302 which is made of glass and which has a laterally elongated rectangular shape are provided a plurality of gate lines 307 serving as scanning conductor lines and a plurality of source lines 308 serving as signal lines perpendicularly intersecting the gate lines 307. In more detail, the gate lines 307 are arranged in the horizontal direction, while the source lines 308 are arranged in the vertical direction.

In the areas surrounded by the gate lines 307 and the source lines 308 are provided pixels 303 in a matrix form. At the intersections between the gate lines 307 and the source lines 308 are provided thin film transistors 304 serving as switching elements.

At a lengthwise end portion of the transparent insulating board 302 is provided a gate line drive element 305 extending in the widthwise direction, where the gate line drive element 305 is connected to an end of each of the gate lines 307. At a widthwise end portion of the transparent insulating board 302 is provided a source line drive element 306 extending in the lengthwise direction, where the source line drive element 306 is connected to an end of each of the source lines 308. It should be noted that the gate line drive element 305 and the source line drive element 306 are practically provided on the transparent insulating board pattern by the COG (Chip On Glass) connection method. The gate line drive element 305 is connected to a plurality of input terminal lines 310.

The gate line drive element 305 sequentially scans the gate lines 307 in the vertical direction while the source line drive element 306 applies a video signal to a source line 308 to write the signal line by line to thereby make the active-matrix display device perform an image display operation.

Portions of the transparent insulating board 302 except for the portions where the gate line drive element 305 and the source line drive element 306 are provided serve as a display section 301.

Between the gate line drive element 305 and the gate lines 307 are provided interruption thin film transistors 309 serving as switching elements to make and break a connection between them. The gate electrodes of the interruption thin film transistors 309 are connected to an interruption signal input terminal 316 formed on the transparent insulating board 302 in a position slightly apart toward an end of the board 302 from the aforementioned input terminal lines 310, and an interruption control signal 313 is input from an external control circuit (not shown) via the interruption signal input terminal 316.

In FIG. 23, (a), (b), and (c) show the waveforms of a video signal 311 supplied to the source lines 308, a scanning signal 312 given to the gate lines 307, and an interruption control signal 313 input to the interruption signal input terminal 316 for the interruption thin film transistor 309, respectively. In FIG. 23, (d) shows the waveform of a certain signal inside the gate line drive element 305.

In the present case, the interruption thin film transistor 309 is provided to prevent the possible bad influence of an instantaneous voltage drop 315 attributed to the change in level from "H" to "L" of the video signal 311 supplied to the source lines 308 from being exerted on the gate line drive element 305. The following describes the detail of the operation with reference to FIG. 23.

As shown in FIG. 23, the interruption control signal 313 having the waveform shown in (c) is given to the interruption signal input terminal 316 for the interruption thin film transistors 309 temporarily in synchronization with the fall from "H" to "L" of the video signal 311 in the present embodiment. While the control signal 313 is given, the interruption thin film transistors 309 are off to open the connection between the gate lines 307 and the gate line drive element 305, i.e., temporarily electrically disconnect the gate lines 307 from the gate line drive element 305.

In the time except for the fall time of the video signal 311, the interruption thin film transistor 309 is on to connect the gate line drive element 305 with the gate lines 307.

At the time when the video signal 311 falls from "H" to "L", there is generated on the scanning signal 312 the instantaneous voltage drop 315 attributed to coupling noise between the scanning signal 312 and the video signal 311 as shown in (b) in FIG. 23.

Figure 26A:
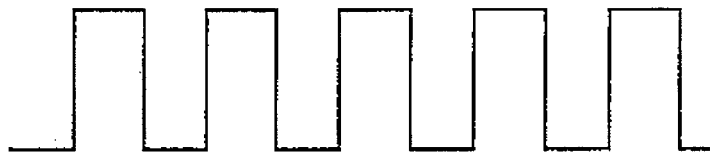
FIG. 26 is a timing chart for explaining a problem caused by the instantaneous voltage drop of a scanning signal.
Figure 26B:
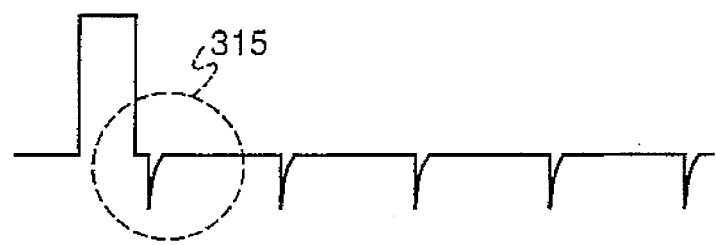
Figure 26C:

If the gate lines are always electrically connected with the gate line drive element 305, the instantaneous voltage drop 315 at the gate lines will be transmitted to the gate line drive element 305 and affect various signals (represented by the signal 314) therein so that a momentary change of voltage takes place to the signal 314 as shown in FIG. 26.

However, since the gate lines 307 are electrically disconnected from the gate line drive element 305 temporarily in synchronization with the fall from "H" to "L" of the video signal 311 in the present embodiment, the bad influence of the instantaneous voltage drop 315 of the scanning signal 312 can be prevented from being exerted on the gate line drive element 305. As a result, as shown in (d) in FIG. 23, various signals represented by the signal 314 in the gate line drive element 305 are in a stable condition, i.e., kept unchanged without suffering from the bad influence of the instantaneous voltage drop 315.

According to the present embodiment, the gate line drive element 305 neither malfunctions nor is subjected to total breakdown due to a voltage exceeding its endurance voltage. Furthermore, since no momentary change of voltage due to the instantaneous voltage drop takes place, a great voltage difference between the "on" voltage and the "off" voltage for the thin film transistor 304 is ensured within the range of the endurance voltage of the gate line drive element 305. The voltage difference is sufficient to easily improve the display quality.

Furthermore, if an active-matrix display device having the gate lines always electrically connected with the gate line drive element is formed by the COG connection method, a resistance combined with the connection resistance and the resistance of the patterned conductor lines on the display board will be exerted on the input terminal lines 310 of the gate line drive element 305 and enlarge the momentary change of voltage due to the instantaneous voltage drop 315. However, in the present invention, because the gate lines 307 are designed to be electrically disconnected from the gate line drive element 305 when the instantaneous voltage drop 315 occurs, the instantaneous voltage drop 315 is not transmitted to the gate line drive element 305 and the voltage change of the signal 314 in the gate line drive element 305 as shown in FIG. 26 is avoided. Therefore, even though a large resistance is exerted on the gate line drive element 305, influence of the voltage drop is not amplified. Thus, in designing the COG connection type display device taking into consideration the operation of the gate line drive element 305 and the display image quality, it is not very necessary to provide against the influence of the resistances added to the input terminal lines 310 of the gate line drive element such as the connection resistance and the resistance of the patterned conductor lines on the display board. As a result, the innate advantages of the COG connection type active-matrix display device, i.e., the fine pitch, low cost, and high reliability can be fully appreciated.

Figure 24:
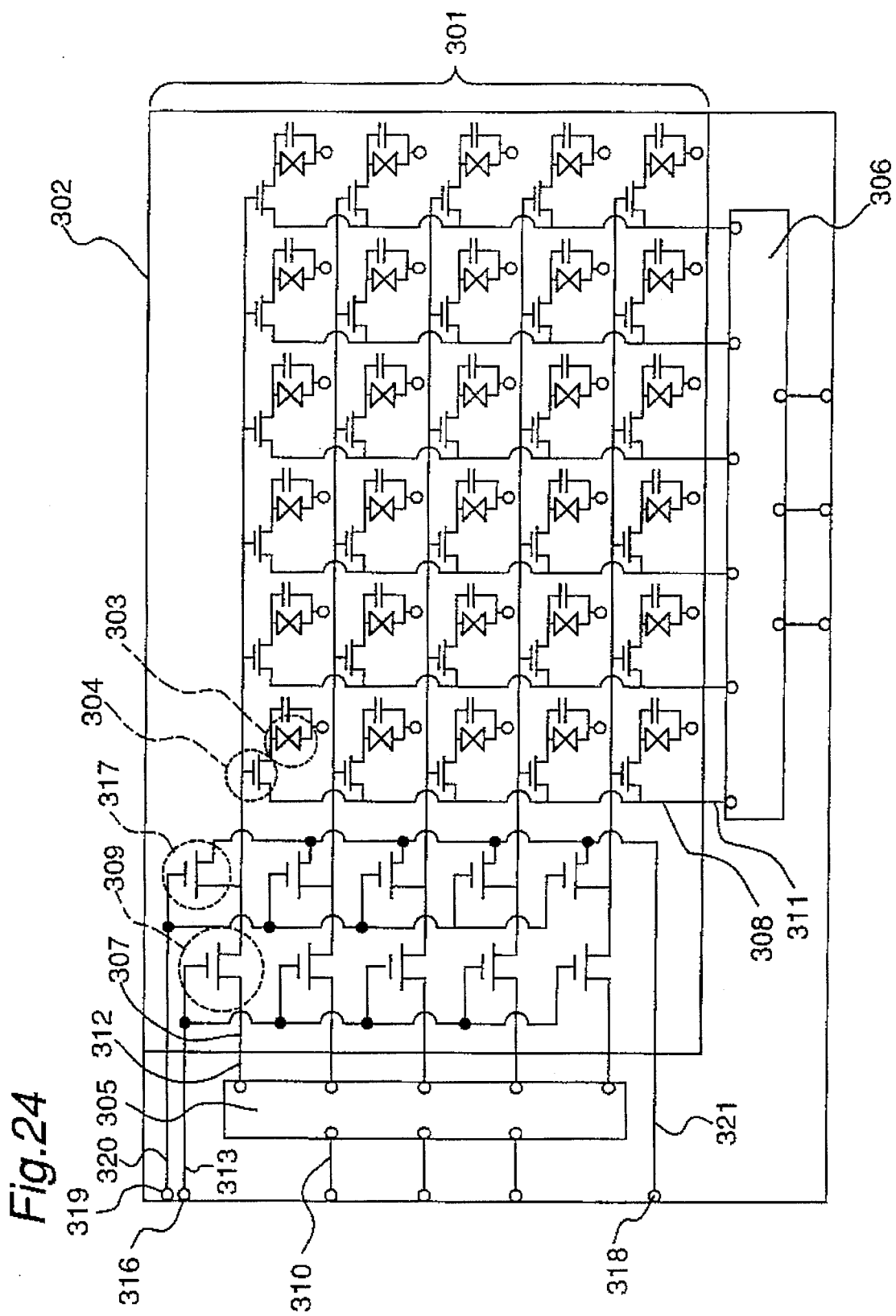
FIG. 24 is a circuit diagram of an active-matrix display device in accordance with an embodiment of the present invention.

FIG. 24 shows an active-matrix display device in accordance with another embodiment of the present invention. The present embodiment takes the measure of avoiding the condition where the thin film transistors 304 are not sufficiently turned off due to the possible instability of the electric potential at the gate lines 307 when the gate lines 307 are electrically disconnected from the gate line drive element 305 by the operation of the interruption thin film transistors 309. The following describes the detail of the construction. It should be noted that the construction of most of the parts is similar to that in FIGS. 22, and therefore like components are denoted by the same reference numerals in FIGS. 22 and 24 and no further description on those components is provided here.

On the transparent insulating board 302 are provided gate line signal switching thin film transistors 317, 317, . . . adjacent to the interruption thin film transistors 309, 309, . . . The gate electrode of each gate line signal switching thin film transistor 317 is connected to a control signal input terminal 319 provided at a portion adjacent to the interruption signal input terminal 316 on the transparent insulating board 302, and a power switching control signal 320 (see FIG. 25 (e)) is input via the control signal input terminal 319 from an external circuit.

The source electrode of each switching thin film transistor 317 is connected to the thin film transistor 304, while the drain electrode thereof is connected to an external power input terminal 318. The external power input terminal 318 is formed in a position slightly apart from the input terminal line 310 at the opposite side from the interruption signal input terminal 316 and control signal input terminal 319, and an OFF voltage signal 321 is input via the external power input terminal 318 from an external power source.

In the construction as described above, the signal 320 is given to the gate electrode of the switching thin film transistor 317 at the time as shown in FIG. 25, i.e., when the video signal 311 falls from "H" to "L" and an interruption control signal 314 at an OFF level is input to the interruption thin film transistors 309. At this time, an OFF voltage 321 is given to the thin film transistors 304 via the external power input terminal 318 and the switching thin film transistors 317.

According to the present embodiment, an OFF voltage to sufficiently turn transistors off is supplied to the thin film transistors 304 when the gate lines 307 are made to be electrically disconnected from the gate line drive element 305 by the operation of the interruption thin film transistors 309. Therefore, the insufficient turning off of the thin film transistors 304 due to the unstable electric potential at the gate lines 307 can be securely prevented.

Although the above description on the embodiments shown in FIGS. 22–25 has been made for the case where the present invention is applied to a COG connection type active-matrix display device, the present invention can be also applied to the case where a TAB (Tape Automated Bonding) drive element is formed by the COF (Chip On Film) method or to the case where a drive element is formed on a glass board.

The thin film transistor to be used in the present invention is typically an insulated gate field effect transistor using amorphous silicon, polysilicon, Te, or the like as a semiconductor material.

Furthermore, the active-matrix display device of the present invention can be applied not only to a monochrome liquid crystal display device but also to a color liquid crystal display device employing a color filter.

As is evident from the above, according to the active-matrix display devices shown in FIGS. 22 and 24, since the connection between the scanning conductor lines and the scanning conductor line drive element is temporarily undone in synchronization with the fall of the video signal level from "H" to "L", the bad influence of the instantaneous voltage drop of the scanning signal due to the amplitude of the video signal can be prevented from being exerted on the gate line drive element regardless of the assembly structure of the drive element.

As a result, the various signals inside the scanning conductor line drive element can be kept stable, and therefore the possible malfunction or breakdown of the element due to a voltage exceeding the endurance voltage of the scanning conductor line drive element can be securely prevented. Furthermore, the momentary change of voltage attributed to the instantaneous voltage drop does not take place, and therefore a great voltage difference can be assured between the "on" voltage and the "off" voltage of the first switching element within the range of the endurance voltage of the gate line drive element.

Thus, the present invention can provide a high-quality, high-reliability active-matrix display device.

Furthermore, the active-matrix display device shown in FIG. 25 can further improve the reliability, because the first switching elements 304 are prevented from being insufficiently turned off due to the instability of the electric potential at the gate lines while the connection between the scanning conductor lines and the scanning conductor line drive element is undone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display device comprising:

a substrate;

a plurality of scanning conductor lines and a plurality of signal conductor lines intersecting the scanning conductor lines on the substrate;

first switching elements, one formed at each intersection between the scanning conductor lines and the signal conductor lines;

a scanning conductor line drive element including at least one scanning drive LSI for driving the scanning conductor lines;

a signal conductor line drive element including at least one display drive LSI for driving the signal conductor lines; and second switching elements, one provided between each scanning conductor line and the scanning conductor line drive element, each second switching element being put into an open state in synchronization with a fall in level of an input video signal provided to a signal conductor line to electrically disconnect the corresponding scanning conductor line from the scanning conductor line drive element so that the scanning conductor line drive element is not affected by instantaneous voltage drop on the scanning conductor line resulting from the fall in level of the input video signal, each second switching element being kept in a closed state at all times, except for the time of the fall in level of the input video signal, to electrically connect the corresponding scanning conductor line to the scanning conductor line drive element.

2. The display device as claimed in claim 1, further comprising:

an external power input terminal connected to an external power source having an OFF voltage sufficient to turn off the first switching elements; and third switching elements, one provided on each scanning conductor line, for switching a signal to be transmitted through a corresponding scanning conductor line between a scanning signal supplied from the scanning conductor line drive element and the OFF voltage, wherein when a second switching element is in an open state, a switching control signal is given to an input terminal of a corresponding third switching element so that the OFF voltage is supplied to the corresponding scanning conductor line to sufficiently turn off a corresponding first switching element.

* * * * *